US007870156B2

(12) United States Patent
Rutter et al.

(10) Patent No.: US 7,870,156 B2
(45) Date of Patent: *Jan. 11, 2011

(54) ORGANIZATIONAL REFERENCE DATA AND ENTITLEMENT SYSTEM WITH ENTITLEMENT GENERATOR

(75) Inventors: David Rutter, Brooklyn, NY (US); Kathryn Duffy, Briarcliff Manor, NY (US); John Hendy, Berkeley Heights, NJ (US); Anant Verma, Berkeley Heights, NJ (US)

(73) Assignee: Morgan Stanley, New York, NY (US)

( * ) Notice: Subject to any disclaimer, the term of this patent is extended or adjusted under 35 U.S.C. 154(b) by 536 days.

This patent is subject to a terminal disclaimer.

(21) Appl. No.: 11/519,378

(22) Filed: Sep. 12, 2006

(65) Prior Publication Data

US 2007/0124269 A1 May 31, 2007

Related U.S. Application Data

(63) Continuation-in-part of application No. 10/930,642, filed on Aug. 31, 2004, now Pat. No. 7,774,365.

(51) Int. Cl.
*G06F 17/30* (2006.01)
(52) U.S. Cl. .............................. 707/783; 707/999.001; 707/999.009; 705/5; 709/204
(58) Field of Classification Search .................. 710/62; 707/9, 783; 709/204
See application file for complete search history.

(56) References Cited

U.S. PATENT DOCUMENTS

| 5,634,053 | A | * | 5/1997 | Noble et al. ................... 707/4 |
| 5,765,153 | A | * | 6/1998 | Benantar et al. ............... 707/9 |
| 5,873,083 | A | * | 2/1999 | Jones et al. ................... 707/4 |
| 5,966,715 | A | | 10/1999 | Sweeney et al. |
| 6,023,765 | A | | 2/2000 | Kuhn |
| 6,070,244 | A | | 5/2000 | Orchier et al. |
| 6,088,679 | A | | 7/2000 | Barkley |
| 6,158,007 | A | | 12/2000 | Moreh et al. |
| 6,385,652 | B1 | | 5/2002 | Brown et al. |
| 6,603,476 | B1 | * | 8/2003 | Paolini et al. ............... 345/427 |
| 6,742,180 | B1 | * | 5/2004 | Ritz ........................... 717/174 |
| 6,871,232 | B2 | | 3/2005 | Curie et al. |
| 6,880,158 | B1 | * | 4/2005 | Basso et al. ................. 719/321 |
| 7,000,222 | B1 | * | 2/2006 | Curtis et al. ................ 717/118 |

(Continued)

OTHER PUBLICATIONS

ILOG JRules: Leading the Way in Business Rule Management Systems, ILOG, Mar. 2005 (15 pages).

(Continued)

*Primary Examiner*—Don Wong
*Assistant Examiner*—Shyue Jiunn Hwa
(74) *Attorney, Agent, or Firm*—K&L Gates LLP

(57) ABSTRACT

A system including a centralized organizational information system in communication with a centralized organizational information database and an entitlement generator in communication with the centralized organizational information system, wherein the entitlement generator is configured to automatically generate at least one executable entitlement rule based on an input rule. The system also includes a federated set of entitlements engines in communication with the entitlement generator and a plurality of entitlement databases, wherein each of the entitlements engines is for determining whether a user is entitled to access secured resources requested by the user based on the executable entitlement rule.

14 Claims, 32 Drawing Sheets

U.S. PATENT DOCUMENTS

| | | | | |
|---|---|---|---|---|
| 7,080,403 | B2* | 7/2006 | McCaffrey et al. | 726/2 |
| 7,124,137 | B2 | 10/2006 | Lin et al. | |
| 7,143,078 | B2 | 11/2006 | Doherty et al. | |
| 7,149,698 | B2* | 12/2006 | Guheen et al. | 705/1 |
| 7,165,174 | B1 | 1/2007 | Ginter et al. | |
| 7,213,017 | B2 | 5/2007 | Rys et al. | |
| 7,383,255 | B2 | 6/2008 | Desai et al. | |
| 7,403,925 | B2* | 7/2008 | Schlesinger et al. | 705/64 |
| 7,404,203 | B2* | 7/2008 | Ng | 726/6 |
| 7,457,810 | B2 | 11/2008 | Breining et al. | |
| 7,523,200 | B2* | 4/2009 | Gross et al. | 709/225 |
| 7,685,060 | B2 | 3/2010 | Casper et al. | |
| 7,774,365 | B2 | 8/2010 | Oxenstierna et al. | |
| 2002/0169876 | A1* | 11/2002 | Curie et al. | 709/226 |
| 2002/0188674 | A1 | 12/2002 | Brown et al. | |
| 2003/0212664 | A1* | 11/2003 | Breining et al. | 707/3 |
| 2004/0122790 | A1* | 6/2004 | Walker et al. | 707/1 |
| 2005/0216555 | A1* | 9/2005 | English et al. | 709/204 |

OTHER PUBLICATIONS

Office Action issued on Feb. 7, 2007 in U.S. Appl. No. 10/930,642.
Office Action issued on Sep. 21, 2007 in U.S. Appl. No. 10/930,642.
Office Action issued on Jul. 3, 2008 in U.S. Appl. No. 10/930,642.
Office Action issued on May 27, 2009 in U.S. Appl. No. 10/930,642.
Office Action issued on Oct. 27, 2009 in U.S. Appl. No. 10/930,642.
Notice of Allowance issued on Apr. 12, 2010 in U.S. Appl. No. 10/930,642.
U.S. Appl. No. 12/760,868, filed Apr. 15, 2010.
U.S. Appl. No. 12/806,512, filed Aug. 13, 2010.
D. Heimbigner et al., "A Federated Architecture for Information Management, ACM Transactions on Information Systems," vol. 3, No. 3, Jul. 1985, pp. 253-278.
"Bridgestream—Company—The Problem," printed from www.bridgestream.com/the_problem.php accessed on Dec. 14, 2004, 2 pages.
"Bridgestream—Solutions," printed from www.bridgestream.com/solutions.php accessed on Dec. 14, 2004, 2 pages.
"Bridgestream—Products," printed from www.bridgestream.com/products.php accessed on Dec. 14, 2004, 2 pages.
"Bridgestream—Company—The Problem," printed from www.bridgestream.com/the_problem.php accessed on Dec. 14, 2004, 2 pages.
"Bridgestream—Solutions," printed from www.bridgestream.com/solutions.php accessed on Dec. 14, 2004, 2 pages.
"Bridgestream—Products," printed from www.bridgestream.com/products.php accessed on Dec. 14, 2004, 2 pages.
D. Heimbigner et al., A Federated Architecture for Information Management, ACM Transactions on Information Systems, v.3 No. 3, p. 253-278, Jul. 1985.

* cited by examiner

1. Create Team XYZ
    1a. Add Team
    1b. Create Team's Relationship to Organization
2. Add Membership: Debra as Member
3. Assign Role: Trades Processing
4. Assign Coverage: CAG Clients A-C

ORGANIZATIONAL REFERENCE DATA AND ENTITLEMENT SYSTEM WITH ENTITLEMENT GENERATOR

CROSS REFERENCE TO RELATED APPLICATION

The present application claims priority as a continuation-in-part application to U.S. application Ser. No. 10/930,642 filed Aug. 31, 2004 now U.S. Pat. No. 7,774,365.

BACKGROUND

Many organizations, such as those in the financial services industry, have multiple databases and systems that are operative to store and manage data regarding, for example, human resources information, client information, etc. Such systems are generally not federated systems and do not allow for sharing of data by multiple applications, centralized resource entitlement, or ease of workflow routing. Also, in such systems each application must determine which users are entitled to access various resources or perform various functions. Thus, each application must have its associated entitlement logic, maintain up-to-date entitlements data, and store the data in storage that is local to the application.

Such systems may be particularly unwieldy in, for example, a financial services entity because access to client accounts is oftentimes restricted and overbroad access may be inadvertently granted to a user that has access to a certain class of resources. Also, because users often move to other organizations within the entity, and their access credentials may not be updated, a user may retain their outdated credentials while assuming new credentials. Such a user would then have the ability to perform functions according to the outdated credentials and the new credentials.

SUMMARY

In one embodiment, the present invention is directed to a system. The system includes a centralized organizational information system in communication with a centralized organizational information database and. an entitlement generator in communication with the centralized organizational information system, wherein the entitlement generator is configured to automatically generate at least one executable entitlement rule based on an input rule. The system also includes a federated set of entitlements engines in communication with the entitlement generator and a plurality of entitlement databases, wherein each of the entitlements engines is for determining whether a user is entitled to access secured resources requested by the user based on the executable entitlement rule.

In one embodiment, the present invention is directed to a computer-implemented method. The method includes storing, in a centralized database, organizational data relating to an organization and generating an executable entitlement rule based on an input rule. The method also includes determining, based on data stored in an entitlements database that is in communication with at least one of a plurality of federated entitlements engines, whether a user is entitled to access secured resources.

In one embodiment, the present invention is directed to a computer-readable medium having stored thereon instructions which, when executed by a processor, cause the processor to:

store, in a centralized database, organizational data relating to an organization;

generate an executable entitlement rule based on an input rule; and determine, based on data stored in an entitlements database that is in communication with at least one of a plurality of federated entitlements engines, whether a user is entitled to access secured resources.

In one embodiment, the present invention is directed to an apparatus. The apparatus includes means for storing, in a centralized database, organizational data relating to an organization and means for generating an executable entitlement rule based on an input rule. The apparatus also includes means for determining, based on data stored in an entitlements database that is in communication with at least one of a plurality of federated entitlements engines, whether a user is entitled to access secured resources.

BRIEF DESCRIPTION OF THE DRAWINGS

Further advantages of the present invention may be better understood by referring to the following description taken in conjunction with the accompanying drawings, in which.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. Also, although various embodiments of the present invention are described herein as being employed in a financial services entity, it can be understood that the various embodiments of the present invention may be employed in any type of entity in any type of industry.

As used herein, the term "entitlement" means management of access control policies for a individual, a computer user, etc. to access a protected resource such as a data resource or other type of data, an application, a work flow task, functionality within an application, etc.

In various embodiments of the present invention, an entitlements integrator, using defined business entitlement rules, translates organizational data and other data into entitlements. The entitlements are stored as entitlement data and applications enforce entitlements by making decisions based on entitlements information queried from an entitlements engine.

Figure 1:
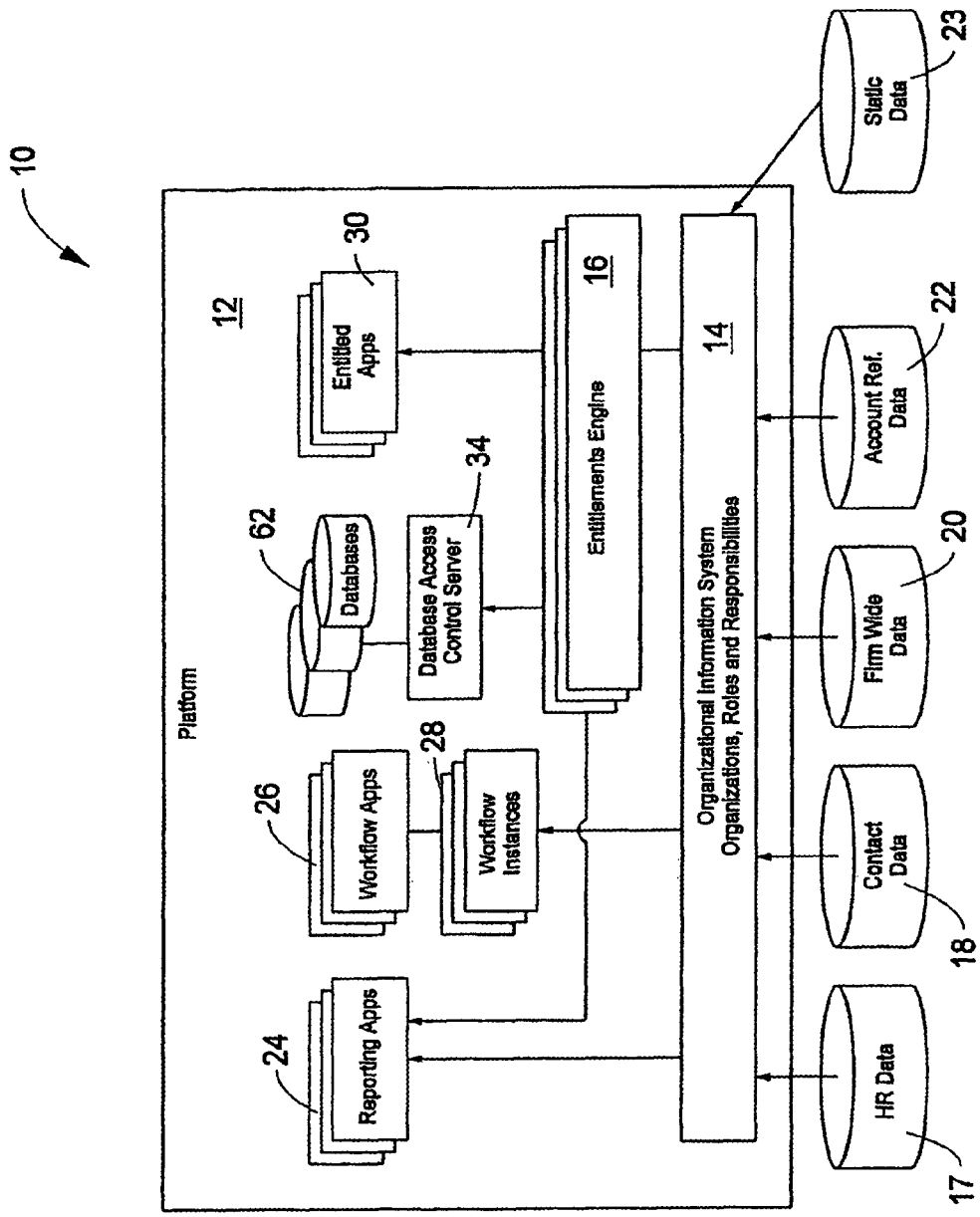
FIG. 1 is a diagram illustrating a system having an organizational data and entitlement platform according to one embodiment of the present invention.

FIG. 1 is a diagram illustrating a system 10 having a reference data and entitlement platform 12 according to one embodiment of the present invention. The platform 12 includes an organizational information system 14 and an entitlements engine 16. The organizational information system 14 manages organizational information relating to organizations, roles, responsibilities, etc. of various members of an entity or organization in which the system 10 is deployed. The entitlements engine 16 manages entitlement as it relates to the various resources (e.g. data, applications, etc.) that are associated with or integrated with the system 10.

In order to accurately describe an organization, the organizational information system 14 may refer to data that is resident in various databases including, for example, a human resources database 17 (e.g., containing human resources data), a contact data database 18 (e.g., containing client contact data), a firmwide directory database 20 (e.g., containing data relating to those members in the organization, or firm, in which the system is utilized), an account reference data database 22 (e.g., containing information relating to accounts, account owners, etc.), and a static data database 23 (e.g., containing, for example, lists of countries and currencies etc.). An example of the organization and type of data that may be stored in the account reference data database 22 is contained in U.S. Patent Application Publication No. US 2002/0116304, which is owned by the assignee of the present application and which is incorporated herein by reference.

The organizational information system 14 may be accessed by various reporting applications 24. The reporting applications 24 enable a user to generate various reports relating to the organization such as, for example, sales revenue reports. Workflow applications 26 may utilize organizational information, as requested by workflow instances 28, from the organizational information system 14. The workflow applications 26 may be, for example, transaction event and exception routing applications, or other workflow applications such as Savvion-based applications. Entitled applications 30 utilize secured resources, access to which is determined by the entitlements engine 16. The entitlements engine 16 determines if a user of an entitled application 30 is entitled to access secured resources on the basis of entitlement data that is derived from the organizational information system 14. Databases 62 are examples of secured resources. Application access to databases 62 can be restricted by a database access control server 34. The database access control server 34 obtains entitlements from the entitlements engine 16. The database access control server 34 may be, for example, a server such as a Sybase Openserver.

Figure 2:
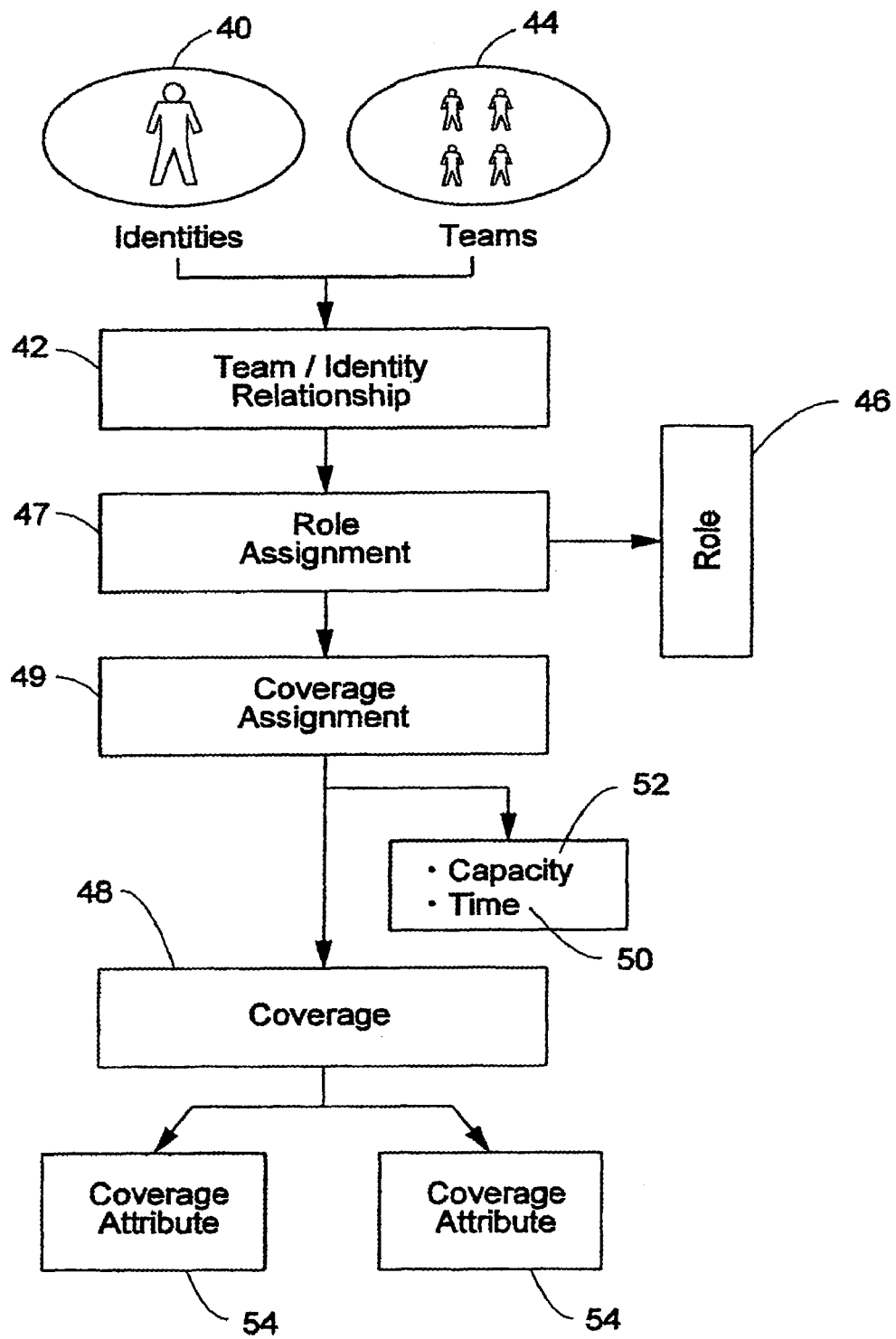
FIG. 2 is a diagram illustrating high level data concepts in a data architecture for the organizational data according to one embodiment of the present invention.

FIG. 2 is a diagram illustrating high-level data concepts in a data architecture for the organizational information system 14 according to one embodiment of the present invention. Identities 40 list all users of the system 10 and teams 44 list all teams that are associated with the system 10. Examples of identities 40 may be employees, contingent workforce personnel, contacts, and automated agents. A relationship 42 defines a relationship between either an identity 40 and a team 44, or between teams 44. The teams 44 may be, for example, organizational teams or virtual teams (i.e. loosely organized teams or teams without formal organization delineators). Examples of relationships 42 are:

1. Joe Employee is a senior manager of department X.
2. Joe Consultant is a consultant to virtual team Y.
3. The relationship between department X and team Y is enabled by task order Z.

Roles 46, as assigned by role assignments 47, define job functions that are assigned to a team 44 or an identity 40 on a team 44 (e.g., client service, data quality, sales trader, research sales, etc.). Coverage 48, as assigned by coverage assignment 49, defines the scope of a team's, or an identity's responsibilities with respect to the assigned role 46 (e.g., covers clients A-M in the equity division). Time 50 defines the periodicity of the coverage (e.g., Monday through Friday from 9am to 5pm EST). Coverage capacity 52 defines the nature of the responsibility of a team 44 or identity 40 (e.g., primary or backup, responsible or interested, etc.). Coverage 48 is defined by coverage attributes 54. Each coverage attribute describes a line of business, financial product, client, system, etc. for which service is being provided by the identities 40 and/or the teams 44.

Figure 3:
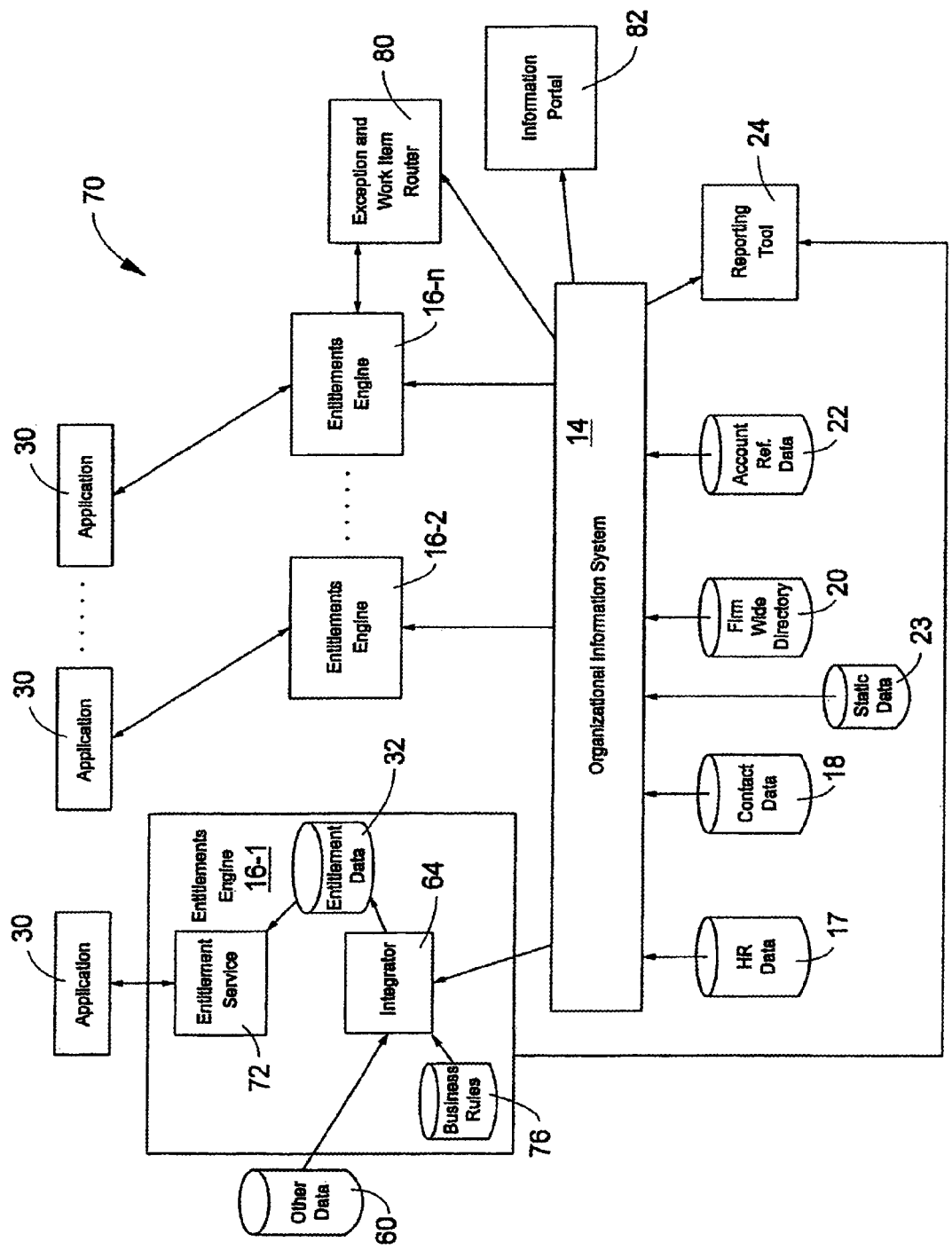
FIG. 3 is a diagram illustrating an entitlement system according to one embodiment of the present invention.

FIG. 3 is a diagram illustrating an entitlement system 70 according to one embodiment of the present invention. As can be seen in FIG. 3, entitlement is done on a federated basis for a number of applications 30. Each of the applications 30 is shown in FIG. 3 as a separate domain that interfaces with a different entitlements engine 16-1 through 16-n. However, it can be understood that a domain that is serviced by an entitlements engine 16 may include more than one application 30. Each entitlement service 72 may have multiple domains and each entitlement service 72 has its own local (entitlement) database 32. In one embodiment, the data that is stored in each of the databases 32 is consistent for each of the entitlements engines 16.

The entitlements data stored in the databases 32 is derived from the organizational information system 14 and other data 60. Business rules 76 define functions and data that need to be protected and who should have access to such functions and data. An example of a business rule 76 is: Everyone with a role of "sales trader" in the ABC group can view trades for the clients that they cover. The other data 60 may be, for example, data that is specific to a particular domain. Integrators 64 read data from the organizational information system 14 and apply business rules 76 to the data. The integrators 64 also store entitlement data in the entitlement databases 32. As such, the entitled applications 30 can make entitlement queries of the entitlements engine 16.

As shown in FIG. 3, when a user using an entitled application 30 attempts to use the application 30 in a way that requires the application 30 to access protected resources, the appropriate entitlements engine 16 determines whether that particular user is authorized to access the protected resources.

In one embodiment, the organizational information system 14 includes a set of maintenance rules (not shown). The maintenance rules may be logical tests that regulate the creation, modification, deletion, etc. of a particular set of organizational information. For example, such a logical test could ensure that a group is not a subgroup of itself. The maintenance rules also may be constraints on what roles 46 or coverage 48 an individual can have. Examples of such rules may be:

1. Anyone with a role of "sales trader" cannot also have a role of "payment processing."
2. Anyone with a role of "sales trader" must have a current NASD Series 7 license.

The system 70 includes an exception and work item router 80 that processes exceptions and routes work flow items. The ability to route work items (exceptions from trade processing systems, incoming faxes, workflow items, etc.) automatically to the rightful owners yields significant benefits. These benefits include, for example, efficiencies because no manual effort is required to forward the work item to the correct owner, risk management improvements because the possibility of misrouting items is greatly reduced, improved customer service because work items are available to client service representatives in a more timely fashion, etc. Various embodiments of the present invention use organizational data including coverage and role definitions to interface with work item systems such as exception processing systems and workflow automation systems.

The system 70 also includes an information portal 82. Organizations often make extensive use of web-based information portals to deliver content to internal users and external clients. The content of such portals varies depending on the needs of the individual users and business areas, based on criteria such as product area, market, location, business division, etc. Significant manual effort is often expended on profiling information portal content to tailor it to specific departments and classes of users. Various embodiments of the present invention use organizational data including coverage and role definitions to determine actual content required in the information portal 82, thus reducing the need for manual content customization.

In operation, the types of requests made by the applications 30 to the organizational information system 14 may be, for example, non-entitlement requests such as requests concerning teams, roles, and coverage. Examples of such requests may be:

1. What team(s) is Sarah Jones on?
2. Who has the role of "sales trader?"
3. Who in the XYZ Division New York team is responsible for confirms processing for the ABC Client Corporation cash equity business?

The types of requests made by the applications 30 to an entitlements engine 16 may be, for example, entitlement requests such as requests concerning operations or reporting. Examples of such requests may be:

1. Can Joe Smith authorize a $1MM payment?
2. Who has the ability to view trades relating to ABC Client Corporation?

Figure 4:
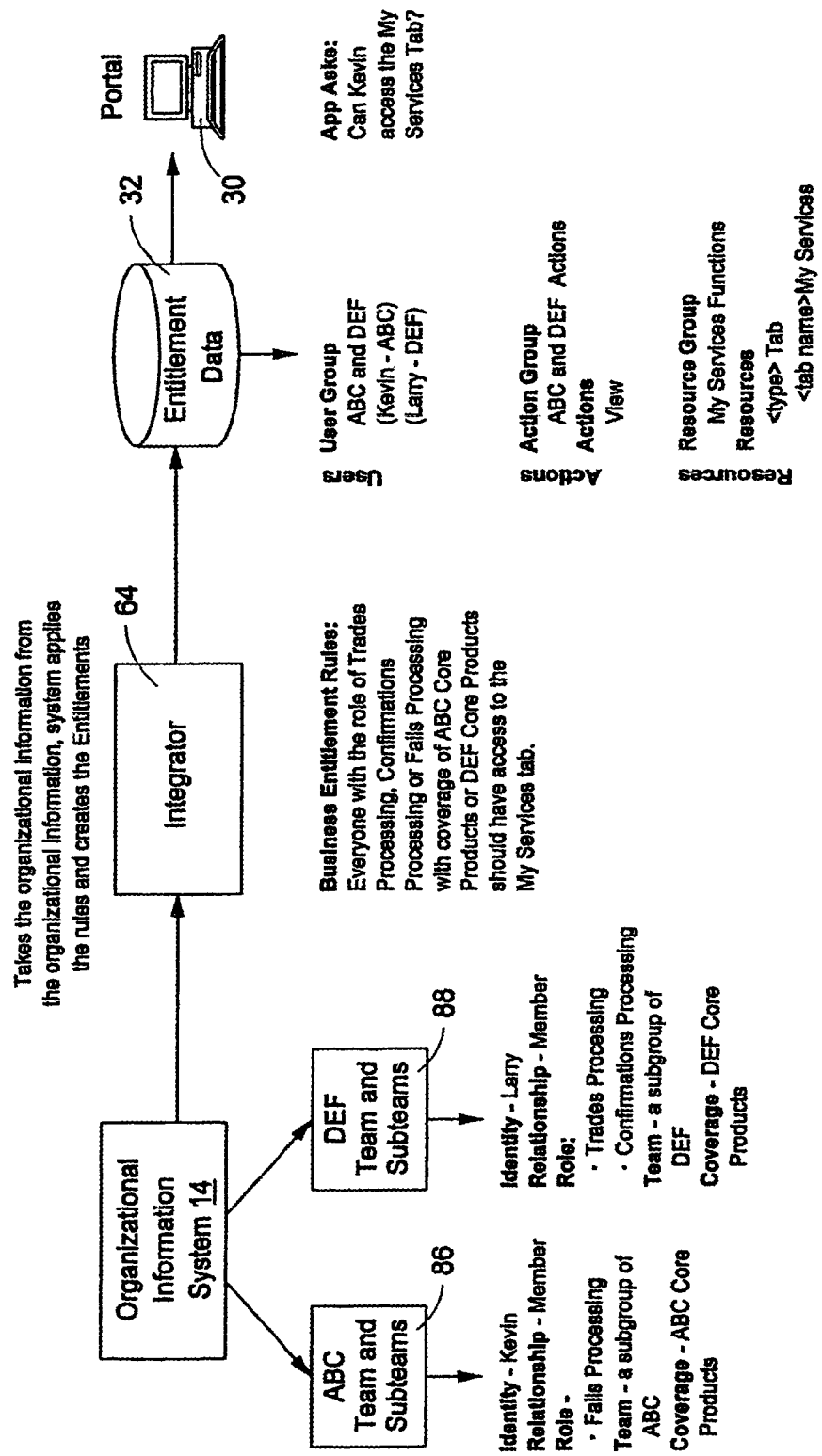
FIG. 4 is a diagram illustrating an example of entitling a secured function using the system of FIG. 1 according to one embodiment of the present invention.

FIG. 4 is a diagram illustrating an example of controlled access to a secured function using the system 10 of FIG. 1 according to one embodiment of the present invention. In the example, the organizational information system 14 contains information on an ABC team and subteams 86 and a DEF team and subteams 88. An individual "Kevin" is on a subgroup of the ABC team and an individual "Larry" is on a subgroup of the DEF team. The integrator 64 takes this information from the organizational information system 14, applies the business rules 76, and creates entitlement data 32. An example of a relevant business rule 76 is that "everyone with the role of trades processing, confirmations processing or fails processing with coverage of ABC Core Products or DEF Core Products should have access to the My Services Tab." The entitlement data 32 is that Kevin is on the ABC team and Larry is on the DEF team and the ABC and DEF action of "View" relates to the resource group "My Services Functions." Thus, an application in a portal that asks: "Can Kevin access the My Services Tab?" will receive an affirmative reply from the entitlements engine 16.

Figure 5:
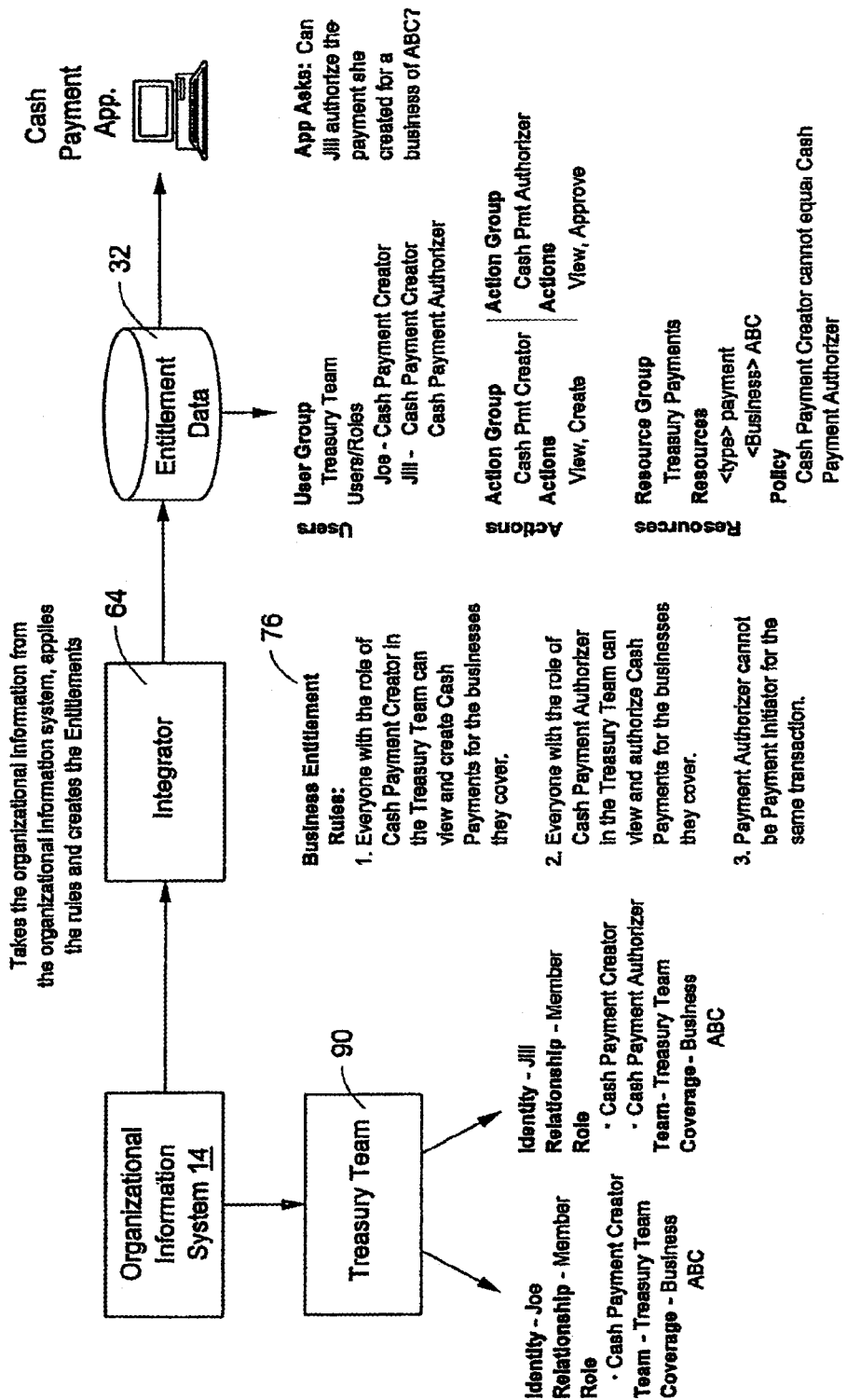
FIG. 5 is a diagram illustrating an example of entitling a secured function using the system of FIG. 1 according to one embodiment of the present invention.

FIG. 5 is a diagram illustrating another example of controlled access to a secured function using the system 10 of FIG. 1 according to one embodiment of the present invention. In the example, the organizational information system 14 includes data on a treasury team 90. The treasury team 90 includes information that Joe has the role of cash payment creator for Business ABC and that Jill has the roles of cash payment creator and cash payment authorizer for Business ABC. The integrator 64 takes this information from the organizational information system 14, applies the business rules 76, and creates entitlement data 32. Examples of relevant business rules 76 are that "everyone with the role of cash payment creator in the treasury team can view and create cash payments for the businesses that they cover," "everyone with the role of cash payment authorizer in the treasury team can view and authorize cash payments for the businesses that they cover," and "payment authorizer cannot be payment initiator for the same transaction." The entitlement data 32 is thus that Joe has the role of creator and Jill has the roles of creator and authorizer in the treasury team, that Joe can view and create and Jill can view, create, and approve, that Joe and Jill have access to the resources of treasury payments, and that, as a policy, a cash payment creator cannot equal a cash payment authorizer.

In the example shown in FIG. 5, when a cash payment application asks: "Can Jill authorize this payment that she created for a Business of ABC?," the entitlement engine 16 will answer in the negative because, as per the policy, the creator cannot be the same individual as the authorizer.

Figure 6:
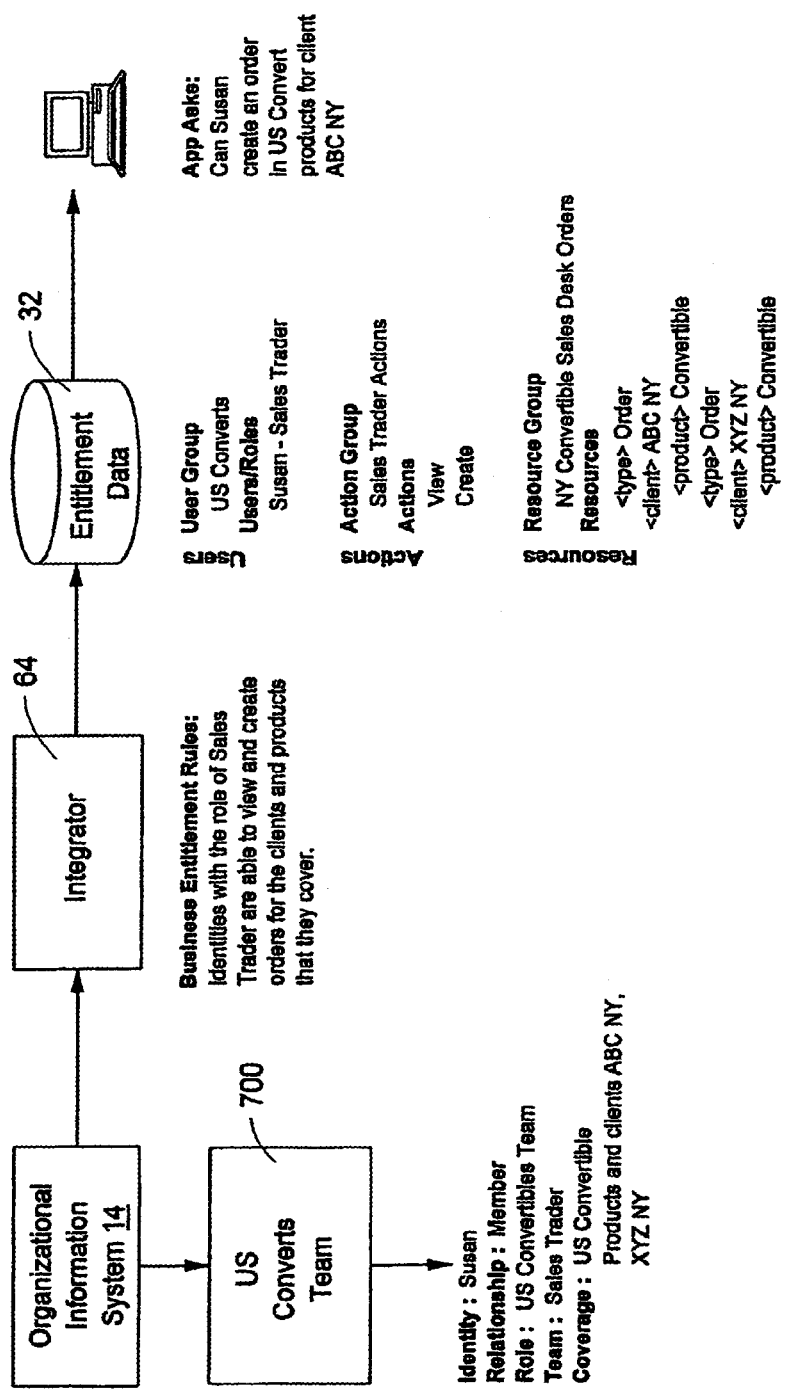
FIG. 6 is a diagram illustrating an example of entitling a secured function using the system of FIG. 1 according to one embodiment of the present invention.

FIG. 6 is a diagram illustrating another example of controlled access to a secured function using the system 10 of FIG. 1 according to one embodiment of the present invention. In the example, the organizational information system 14 includes a US convertibles team 700. The convertibles team 700 includes information that Susan has the role of sales trader for US convertible products and for clients ABC NY and XYZ NY. The integrator 64 takes this information from the organizational information system 14, applies the business rules 76, and creates entitlement data 32. An example of a relevant business rule 76 is that "identities with the role of sales trader are able to view and create orders for the clients and products that they cover." The entitlement data 32 is thus that Susan has the role of sales trader and she can view and create the resources of NY convertible sales desk orders.

In the example shown in FIG. 6, when an order entry application asks: "Can Susan create an order in US convertible products for client ABC NY?," the entitlement engine 16 will answer in the affirmative.

Figure 7:
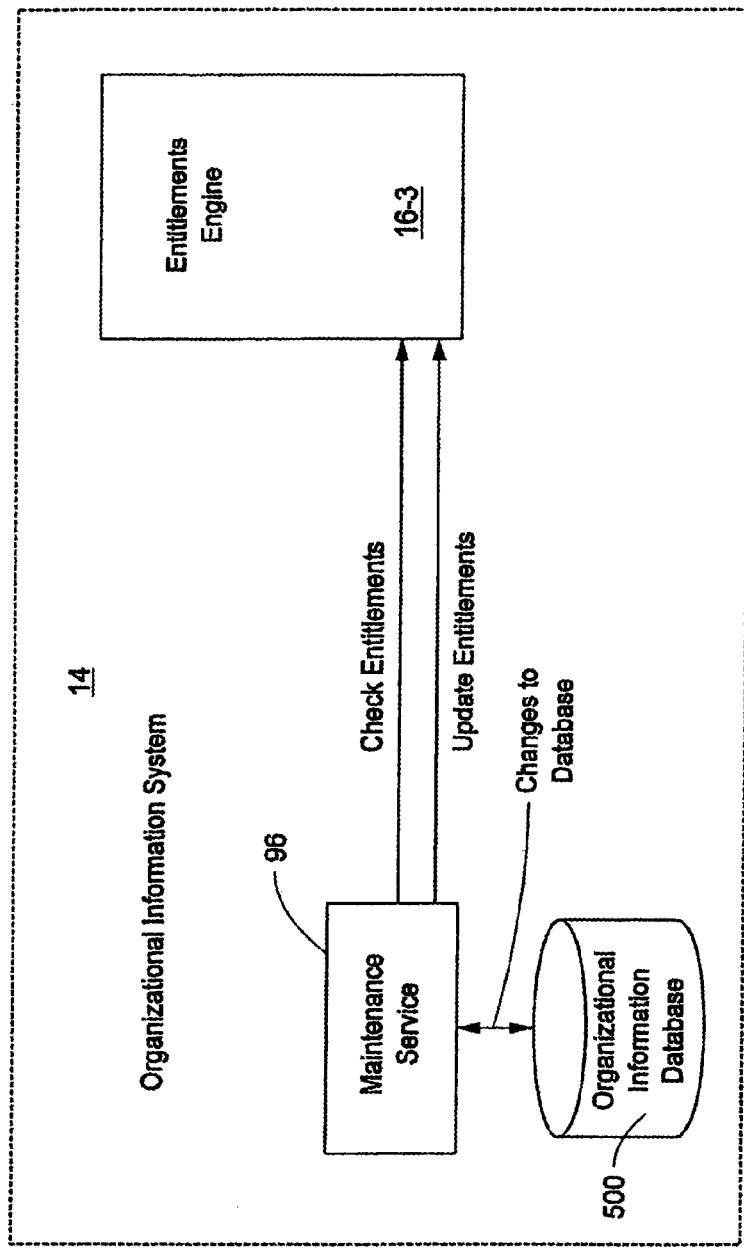
FIG. 7 is a diagram illustrating use of the entitlements engine by the organizational information system itself according to one embodiment of the present invention.

FIG. 7 is a diagram illustrating use of the entitlements engine 16 by the organizational information system 14 itself according to one embodiment of the present invention. An organizational information system 14 includes an organizational information database 500, a maintenance service 96, and an entitlements engine 16-3. The maintenance service 96 validates all requests made of the organizational information system 14 (e.g., create, update, read, delete, etc.) using the entitlements engine 16-3.

A maintenance service 96 permits, for example, authorized users to maintain the organizational information. In one embodiment, the maintenance service 96 uses an entitlement engine 16-3 to verify that the user of the maintenance service is entitled to access organizational information. In operation, the maintenance service 96 allows a user of the organizational information system 14 to add, remove, update, and alter organization information as described in connection with FIG. 2.

The maintenance service 96 may ensure that the correct steps, or workflow, are followed when a user attempts to add, remove, update or alter any organizational information. For example, the maintenance service 96 may require that, before the coverage 48 is changed for an individual to specify that the individual covers, for example, ABC Client Corporation, a manager electronically consent to the change before the change is effected in the organizational information system 14. In another example, if the coverage 48 is going to be changed for an individual to specify that the individual is allowed to authorize cash payments, a individual specified in the organizational information system 14 as the owner of the role of authorization cash payments has to electronically approve the addition of the role of authorize cash payments for the individual to which it is to be associated.

Changes to roles and coverage in the organizational information database 500 that impact entitlements relating to the organizational information system 14 (e.g., changes to organizational information system maintenance roles and coverage) are propagated to the entitlements engine 16-3.

Figure 8:
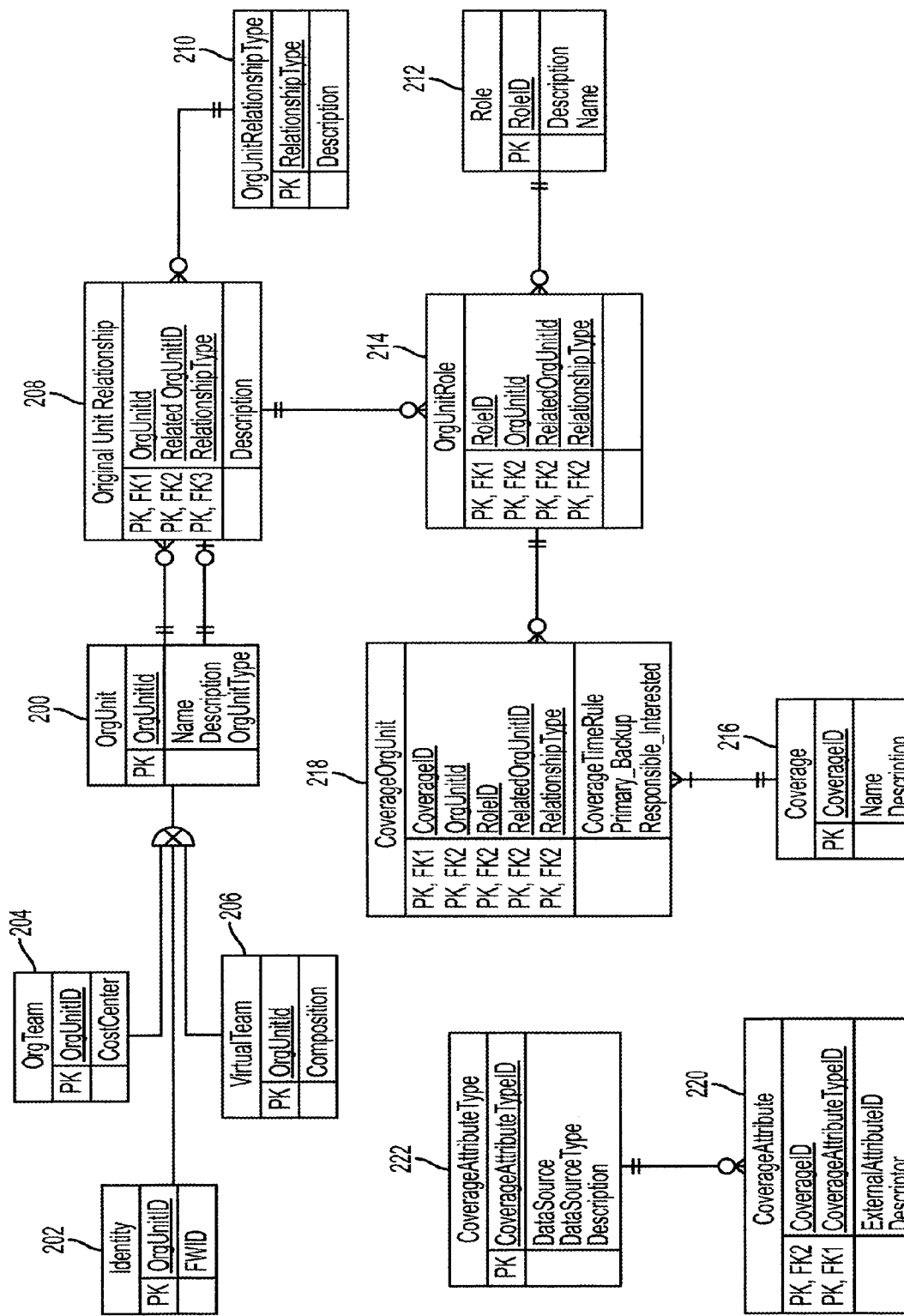
FIG. 8 illustrates a logical data model of organizational information according to one embodiment of the present invention.

FIG. 8 illustrates a logical data model of the organizational information database 500 according to one embodiment of the present invention. Data entities associated with the data structure are illustrated in the following tables.

TABLE 1

OrgUnit 200
This table shows information about the organizational units that the organization that utilizes the system 10 is comprised of.

| Column | Description |
| --- | --- |
| OrgUnitID | Unique identifier for an Organizational Unit |
| Name | Name of the Organizational Unit |
| Description | Brief description of the Organizational Unit |
| OrgUnitType | Identities, Organizational Teams and Virtual Teams in the subtype tables. |

TABLE 2

Identity 202
This table shows organizational information that is specific to identities.

| Column | Description |
| --- | --- |
| OrgUnitID | Unique identifier for a Organizational Unit |
| FWID | Firmwide Directory ID |

TABLE 3

OrgTeam 204
This table shows detailed information that is specific to organizational teams.

| Requirement | Description |
| --- | --- |
| OrgUnitID | Unique identifier for a Organizational Unit |
| CostCenter | The cost center for the Organizational Unit |

TABLE 4

VirtualTeam 206
This table shows detailed information that is specific to virtual teams.

| Requirement | Description |
| --- | --- |
| OrgUnitID | Unique identifier for a Organizational Unit |
| Composition | Describes if the Virtual Team is comprised of internal employees, external clients or mixed identities |

TABLE 5

OrgUnitRelationship 208
This table shows the nature of the relationship that may exist either between teams or between teams and identities. This can be used to capture parent-child hierarchies, relationship with contingent workforce team, team membership, the membership capacity of an identity on a particular team, etc.

| Requirement | Description |
| --- | --- |
| OrgUnitID | Unique identifier for a Organizational Unit |
| RelatedOrgUnitID | The organizational unit that OrgUnitID is related to |
| RelationshipType | Describes the type of relationship shared by the two organizational units |
| Description | Brief information about the organizational relationship |

TABLE 6

OrgUnitRelationshipType 210
This table shows the relationships two organizational units may share.

| Requirement | Description |
| --- | --- |
| RelationshipType | Describes the type of relationship shared by the two organizational units |
| Description | Brief information about the relationship type |

TABLE 7

Role 212
This table shows a list of assignable roles

| Requirement | Description |
|---|---|
| RoleID | Unique identifier for a role |
| Name | The name of the role |
| Description | Brief information about the role |

TABLE 8

OrgUnitRole 214
This table shows the role assigned to either an identity as a member of team or to a team as it relates to another team.

| Requirement | Description |
|---|---|
| OrgUnitID | Unique identifier for a Organizational Unit |
| RelatedOrgUnitID | The organizational unit that OrgUnitID is related to |
| RelationshipType | Describes the type of relationship shared by the two organizational units |
| RoleID | Unique identifier for a role |

TABLE 9

Coverage 216
This table shows the coverage records assignable to teams and identities.

| Requirement | Description |
|---|---|
| CoverageID | Unique identifier for a coverage record |
| Name | System generated name for the coverage record |
| Description | Brief information about the coverage record |

TABLE 10

CoverageOrgUnit 218
This table associates coverage records with an identity as a member of a team with a role or a team related to another team with a role.

| Requirement | Description |
|---|---|
| OrgUnitID | Unique identifier for a Organizational Unit |
| RelatedOrgUnitID | The organizational unit that OrgUnitID is related to |
| RelationshipType | Describes the type of relationship shared by the two organizational units |
| RoleID | Unique identifier for a role |
| CoverageID | Unique identifier for a coverage record |
| CoverageTimeRule | Stores the time and the periodicity of when the coverage is active |
| Primary_Backup | Stores the coverage capacity of being primary or backup |
| Responsible_Interested | Stores the coverage capacity of being responsible or interested |

TABLE 11

CoverageAttribute 220
This table stores the individual coverage attributes that comprise a coverage record.

| Requirement | Description |
|---|---|
| CoverageID | Unique identifier for a coverage record |
| CoverageTypeID | The source type of the coverage attribute |
| ExternalAttributeID | Unique identifier for a coverage attribute from an external data source |
| Descriptor | A system generated field describing the coverage attribute |

TABLE 12

CoverageAttributeType 222
This table contains a list of the coverage attribute data sources.

| Requirement | Description |
|---|---|
| CoverageTypeID | The source type of the coverage attribute |
| Data Source | Unique identifier for a coverage attribute in the data source |
| DataSourceType | The application type of the resource - e.g., Sybase, DB/2, LDAP |
| Description | Brief information about the coverage type |

Figure 9:
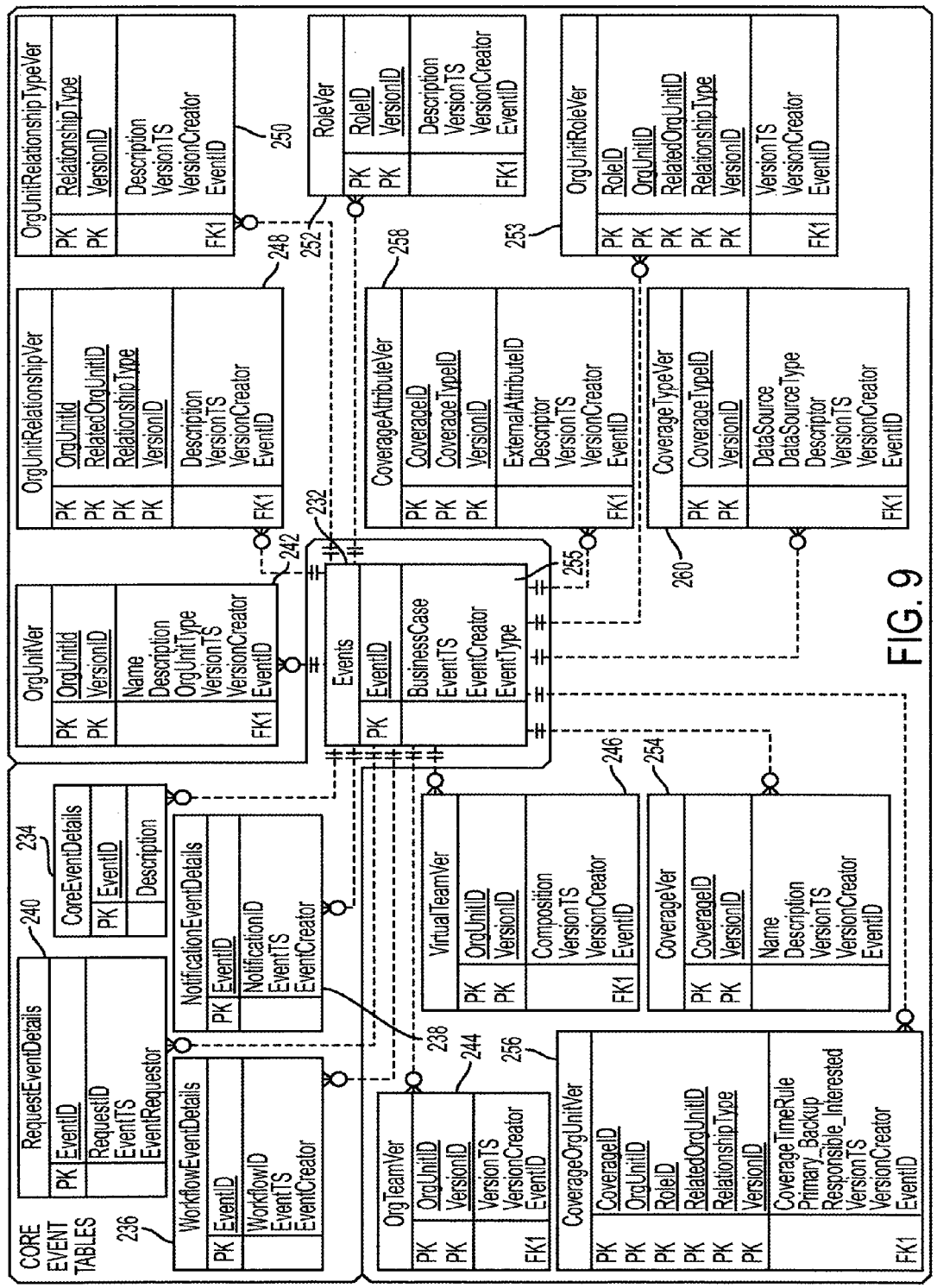
FIG. 9 illustrates a logical data model of an audit database that is used by the organizational information system according to one embodiment of the present invention.

FIG. 9 illustrates a logical data model of an audit database that is used by the organizational information system 14 according to one embodiment of the present invention. The data model of FIG. 9 provides a graphical representation of various data entities that may be required to support the creation of an audit trail within the organizational information system 14. An audit database 230 may be co-located with the organizational information database 500 and may be a repository of tables that is responsible for capturing events and their corresponding details.

Table 13 events that may be captured within the audit database 230 to enable accurate and efficient creation of audit trails for all organizational information system 14 functionality.

TABLE 13

Audit Events
Events

Disabling of an identity
New role assignment to an identity
Removal of role assignment from an identity
New relationship assignment to an identity
Update of relationship assigned to an identity
Removal of relationship assigned to an identity
New relationship assignment to a team
Update relationship assigned to a team
Removal of relationship assigned to a team
Update of team details (composition, cost center, etc.)
New role assignment to a team
Removal of role assignment from a team
New relationship type
Removal of an existing relationship type
New role created
Removal of a role
Update of Coverage Details
New Coverage Attribute
Removal of Coverage Attribute
Modification of Coverage Attribute
New Coverage Attribute type
Update of existing Coverage Attribute Type
Removal of Coverage Attribute Type
Workflow initiated
Workflow step initiated
Workflow step completion
Workflow completion
Sending of Notification
Entitlements The following tables provide an explanation of various entities that are outlined in the audit log logical data model of FIG. 9, as well as providing a sample set of attributes for illustration.

TABLE 14

Events 234
This table logs all of the system events that may occur in the organizational information system 14. Each Event ID 232 may tie into multiple versions of audited entities. Each version represents a separate insert, update or delete operation within the organizational information system 14.

| Requirement | Description |
|---|---|
| EventID | Unique identifier for organizational information system system event |
| BusinessCase | Descriptor explaining the business case for each event |
| EventTS | Timestamp of when the event was initiated |
| EventCreator | The FWID of the initiator of the event |
| EventType | Unique identifier for the different event types that may occur within the organizational information system |

TABLE 15

EventType 255
This table stores detailed information for core organizational information system 14 events 234.

| Requirement | Description |
|---|---|
| EventType | Unique identifier for the different event types that may occur within the organizational information system |
| Description | Information on the nature of the organizational information system system event type |

TABLE 16

WorkflowEventDetails 236
This table captures the workflow events 236 issued by the organizational information system 14.

| Requirement | Description |
|---|---|
| EventID | Unique identifier for organizational information system system event |
| WorkflowID | Unique identifier for workflow events |
| EventTS | Timestamp of when the workflow event was initiated |
| EventCreator | The FWID of the initiator of the workflow event |

TABLE 17

NotificationEventDetails 238
This table captures the Notification events 238 issued by the organizational information system 14.

| Requirement | Description |
|---|---|
| EventID | Unique identifier for organizational information system system event |
| NotificationID | Unique identifier for notification events |
| EventTS | Timestamp of when the notification event was initiated |
| EventCreator | The FWID of the initiator of the notification event |

TABLE 18

RequestEventDetails 240
This table captures the Request events 240 initiated by requesting systems.

| Requirement | Description |
|---|---|
| EventID | Unique identifier for organizational information system system event |
| RequestID | Unique identifier for request events |
| EventTS | Timestamp of when the request event was initiated |
| EventRequestor | The FWID of the initiator of the request event |

TABLE 19

OrgUnitVer 242
This table captures the OrgUnit entity 242 and adds columns for data versioning and event auditing.

| Column | Description |
|---|---|
| OrgUnitID | Unique identifier for a Organizational Unit |
| Name | Name of the Organizational Unit |
| Description | Brief description of the Organizational Unit |
| OrgUnitType | Identities, Organizational Teams and Virtual Teams in the subtype tables. |
| VersionID | Unique identifier for the version |
| EventID | Unique identifier for organizational information system event |
| VersionTS | Timestamp of when the version was created |
| VersionCreator | The FWID of the creator of the version |

TABLE 20

IdentityVer (not shown in FIG. 9)
This table captures the Identity entity and adds columns for data versioning and event auditing.

| Column | Description |
|---|---|
| OrgUnitID | Unique identifier for a Organizational Unit |
| FWID | Firmwide Directory ID |
| VersionID | Unique identifier for the version |
| EventID | Unique identifier for organizational information system system event |
| VersionTS | Timestamp of when the version was created |
| VersionCreator | The FWID of the creator of the version |

TABLE 21

OrgTeamVer 244
This table captures the OrgTeam entity 244 and adds columns for data versioning and event auditing.

| Requirement | Description |
|---|---|
| OrgUnitID | Unique identifier for a Organizational Unit |
| CostCenter | The cost center for the Organizational Unit |
| VersionID | Unique identifier for the version |
| EventID | Unique identifier for organizational information system system event |
| VersionTS | Timestamp of when the version was created |
| VersionCreator | The FWID of the creator of the version |

TABLE 22

VirtualTeamVer 246
This table captures the VirtualTeam entity 246 and adds columns for data versioning and event auditing.

| Requirement | Description |
|---|---|
| OrgUnitID | Unique identifier for a Organizational Unit |
| Composition | Describes if the Virtual Team is comprised of internal organization employees, external clients or mixed identities |

TABLE 22-continued

VirtualTeamVer 246
This table captures the VirtualTeam entity 246 and adds columns for data versioning and event auditing.

| Requirement | Description |
| --- | --- |
| VersionID | Unique identifier for the version |
| EventID | Unique identifier for organizational information system system event |
| VersionTS | Timestamp of when the version was created |
| VersionCreator | The FWID of the creator of the version |

TABLE 23

OrgUnitRelationshipVer 248
This table captures the OrgUnitRelationship entity 248 and adds columns for data versioning and event auditing.

| Requirement | Description |
| --- | --- |
| OrgUnitID | Unique identifier for a Organizational Unit |
| RelatedOrgUnitID | The organizational unit that OrgUnitID is related to |
| RelationshipType | Describes the type of relationship shared by the two organizational units |
| Description | Brief information about the organizational relationship |
| VersionID | Unique identifier for the version |
| EventID | Unique identifier for organizational information system system event |
| VersionTS | Timestamp of when the version was created |
| VersionCreator | The FWID of the creator of the version |

TABLE 24

OrgUnitRelationshipTypeVer 250
This table captures the OrgUnitRelationshipType entity 250 and adds columns for data versioning and event auditing.

| Requirement | Description |
| --- | --- |
| RelationshipType | Describes the type of relationship shared by the two organizational units |
| Description | Brief information about the relationship type |
| VersionID | Unique identifier for the version |
| EventID | Unique identifier for organizational information system system event |
| VersionTS | Timestamp of when the version was created |
| VersionCreator | The FWID of the creator of the version |

TABLE 25

RoleVer 252
This table captures the Role entity 252 and adds columns for data versioning and event auditing.

| Requirement | Description |
| --- | --- |
| RoleID | Unique identifier for a role |
| Name | The name of the role |
| Description | Brief information about the role |
| VersionID | Unique identifier for the version |
| EventID | Unique identifier for organizational information system system event |
| VersionTS | Timestamp of when the version was created |
| VersionCreator | The FWID of the creator of the version |

TABLE 26

OrgUnitRoleVer 253
This table captures the OrgUnitRoleVer entity 253 and adds columns for data versioning and event auditing.

| Requirement | Description |
| --- | --- |
| OrgUnitID | Unique identifier for a Organizational Unit |
| RelatedOrgUnitID | The organizational unit that OrgUnitID is related to |
| RelationshipType | Describes the type of relationship shared by the two organizational units |
| RoleID | Unique identifier for a role |
| VersionID | Unique identifier for the version |
| EventID | Unique identifier for organizational information system system event |
| VersionTS | Timestamp of when the version was created |
| VersionCreator | The FWID of the creator of the version |

TABLE 27

CoverageVer 254
This table captures the Coverage entity 254 and adds columns for data versioning and event auditing.

| Requirement | Description |
| --- | --- |
| CoverageID | Unique identifier for a coverage record |
| Name | System generated name for the coverage record |
| Description | Brief information about the coverage record |
| VersionID | Unique identifier for the version |
| EventID | Unique identifier for organizational information system system event |
| VersionTS | Timestamp of when the version was created |
| VersionCreator | The FWID of the creator of the version |

TABLE 28

CoverageOrgUnitVer 256
This table captures the CoverageOrgUnit entity 256 and adds columns for data versioning and event auditing.

| Requirement | Description |
| --- | --- |
| OrgUnitID | Unique identifier for a Organizational Unit |
| RelatedOrgUnitID | The organizational unit that OrgUnitID is related to |
| RelationshipType | Describes the type of relationship shared by the two organizational units |
| RoleID | Unique identifier for a role |
| CoverageID | Unique identifier for a coverage record |
| CoverageTimeRule | Stores the time and the periodicity of when the coverage is active |
| Primary_Backup | Stores the coverage capacity of being primary or backup |
| Responsible_Interested | Stores the coverage capacity of being responsible or interested |
| VersionID | Unique identifier for the version |
| EventID | Unique identifier for organizational information system system event |
| VersionTS | Timestamp of when the version was created |
| VersionCreator | The FWID of the creator of the version |

TABLE 29

CoverageAttributeVer 258
This table captures the CoverageAttributeVer entity 258 and adds columns for data versioning and event auditing.

| Requirement | Description |
| --- | --- |
| CoverageID | Unique identifier for a coverage record |
| CoverageTypeID | The source type of the coverage attribute |

TABLE 29-continued

CoverageAttributeVer 258
This table captures the CoverageAttributeVer entity 258 and adds columns for data versioning and event auditing.

| Requirement | Description |
| --- | --- |
| ExternalAttributeID | Unique identifier for a coverage attribute from an external data source |
| Descriptor | A system generated field describing the coverage attribute |
| VersionID | Unique identifier for the version |
| EventID | Unique identifier for organizational information system system event |
| VersionTS | Timestamp of when the version was created |
| VersionCreator | The FWID of the creator of the version |

TABLE 30

CoverageTypeVer 260
This table captures the CoverageAttributeTypeVer 260 entity and adds columns for data versioning and event auditing.

| Requirement | Description |
| --- | --- |
| CoverageTypeID | The source type of the coverage attribute |
| Data Source | Unique identifier for a coverage attribute in the data source |
| DataSourceType | The application type of the resource - e.g., Sybase, DB/2, LDAP |
| Description | Brief information about the coverage type |
| VersionID | Unique identifier for the version |
| EventID | Unique identifier for organizational information system system event |
| VersionTS | Timestamp of when the version was created |
| VersionCreator | The FWID of the creator of the version |

Figure 10:
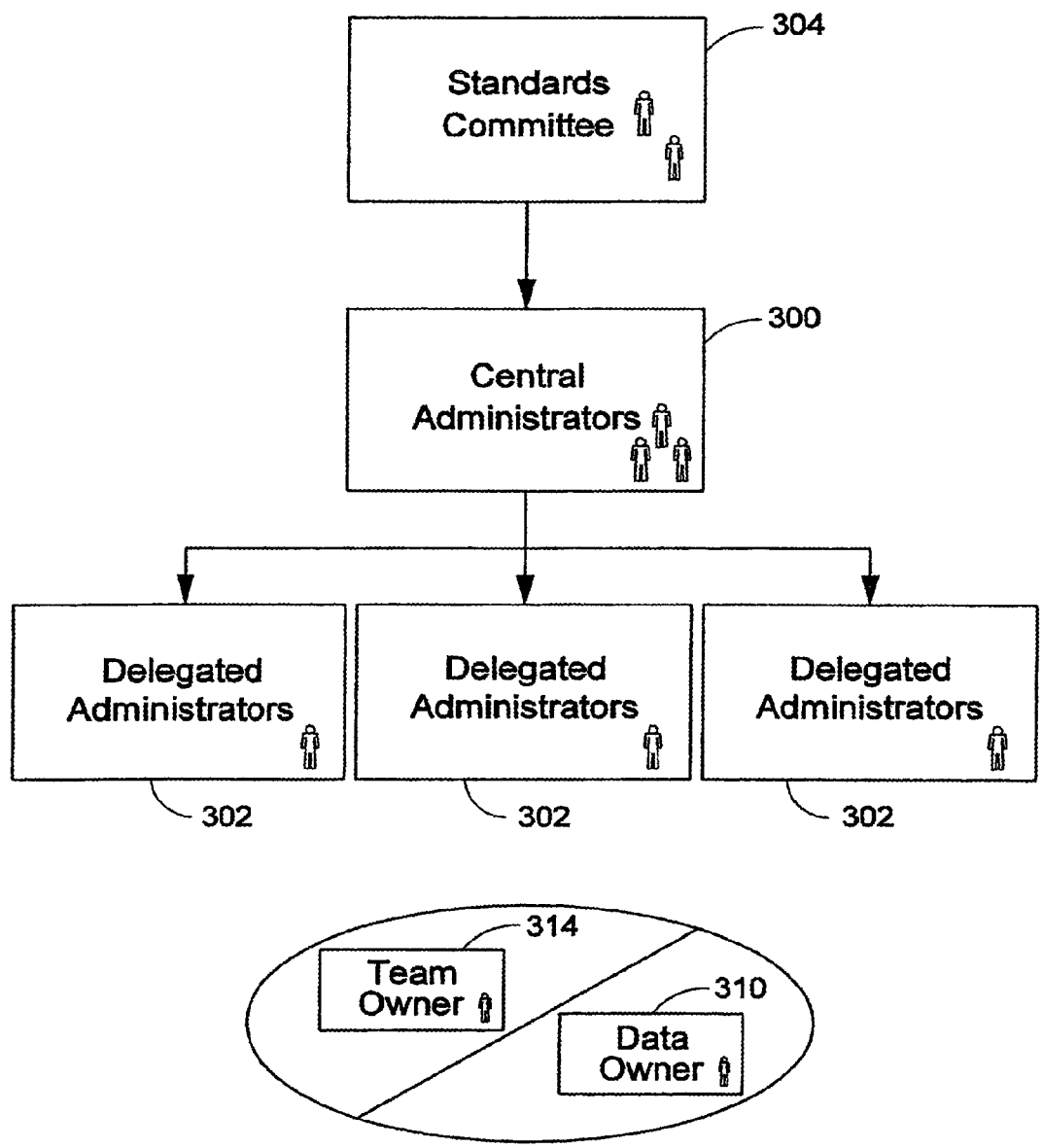
FIG. 10 illustrates an organizational design of an organizational data maintenance organization according to one embodiment of the present invention.

FIG. 10 illustrates an organizational design of a data maintenance organization according to one embodiment of the present invention. The data maintenance organization ensures data integrity by distributing administration responsibilities to users that are dependent on the accuracy of the data.

A Central Administration group 300 has the ultimate responsibility for reference data maintenance. As "super users" of the organizational information system maintenance service 96, the Central Administration group 300 delegates administration responsibilities and privileges to Delegated Administrators 302 across the organizational information system 14 user population. The responsibilities of the Central Administration group 300 are outlined in Table 31.

TABLE 31

| Role | Responsibility |
| --- | --- |
| Central Administrator | Create groups and assign coverage based on any set of available attributes. Delegate group administration to various business units and geographies. Define restrictions around group creation, such as which attributes can be used to define coverage. Add reference data identities to groups Administer reference data roles and attributes |

TABLE 31-continued

| Role | Responsibility |
| --- | --- |
| Central Administration Manager | Organizational information system Super user Create new central administrators |

The responsibilities of Data Owners 310 are outlined in Table 32.

TABLE 32

| Role | Responsibility |
| --- | --- |
| Central Standards Review Group | Ensure that standards in the definition of rules, use of coverage and definition of teams are in place. |
| Role Standards Group | Sub-set of the Central Standards Review Group Ensure role standardization by reviewing and granting or denying new role requests. |
| Role Owner | Define business rules around and control access to the roles available for assignment to identities and teams. |
| Data Owner | Approve team membership requests for teams covering highly sensitive data. Approve requests to assign coverage of highly sensitive data |

In order to optimize the data maintenance process, administration capabilities may be delegated across the organizational information system user population. Delegated Administrators 302 may be granted full rights to administer those teams within their realm of delegation. The responsibilities of Team Owners 314 are outlined in Table 33.

TABLE 33

| Role | Responsibility |
| --- | --- |
| Delegated Administrator | Create and maintain groups (including assigning coverage) within their realm of delegation. Further delegate group administration within their realm of delegation Delegate identity administration to team owners Assign replacements when team owners leave the organization. |
| Delegated Administrators in each group cost center | Maintain organizational groups in reference data within their cost center. Further delegate group administration |
| Delegated Administrators in non-group cost centers | Maintain organizational groups in reference data within their cost center Further delegate group administration |

TABLE 33-continued

| Role | Responsibility |
| --- | --- |
| Team Owner | For each team in reference data, virtual or organizational, there will need to be two team owners. Approve access to their team Manage their team membership, including coverage. Require additional approval from data owners and line managers when appropriate |
| Line Managers/ Officers | Grant an identity access to certain organizational and virtual teams, in addition to or instead of Team Owner approval |
| Relationship Managers | Grant an identity (specifically, a client contact) access to certain virtual teams, in addition to or instead of Team Owner approval |

Self-maintenance allows for real-time team membership updates. All organizational information system 14 users may have a role in the data maintenance organization as requestors, initiating the team enrollment process as outlined in Table 34.

| Role | Responsibility |
| --- | --- |
| Self Maintenance | Add and remove themselves to non-secure virtual teams |
| Requestor | Request to be added to coverage groups Request on behalf of someone for that individual to be added to a coverage group. |

Figures 11, 12:
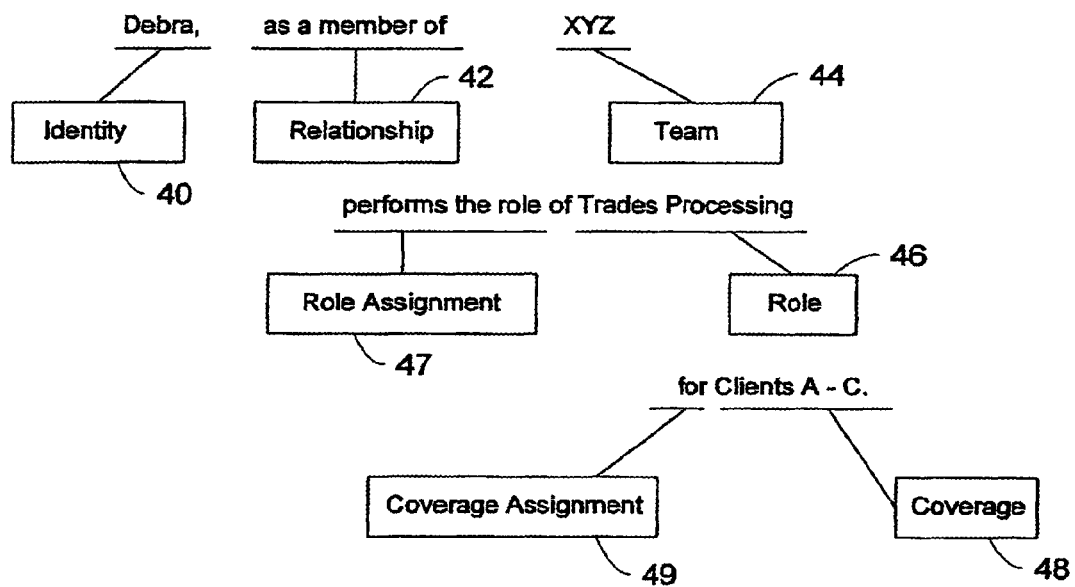
FIGS. 11 and 12 illustrate an example of high level organizational information according to one embodiment of the present invention.

FIGS. 11 and 12 illustrate an example of high-level reference data according to one embodiment of the present invention. The example of FIGS. 11 and 12 use the high level data design of FIG. 2. In FIGS. 11 and 12, a sentence analogy is used to demonstrate the assignment of coverage to an individual on the XYZ team, with a role of Trades Processing. As can be seen in FIGS. 11 and 12, coverage is assigned to the role 46 that a team 44 or individual has in the context of their relationship 42 to the team 44 on which they belong. Thus, as seen in FIGS. 11 and 12, Debra does not merely have coverage of Clients A-C, but rather covers Clients A-C as a member of the XYZ team, with the role of Trades Processing.

Figure 13:
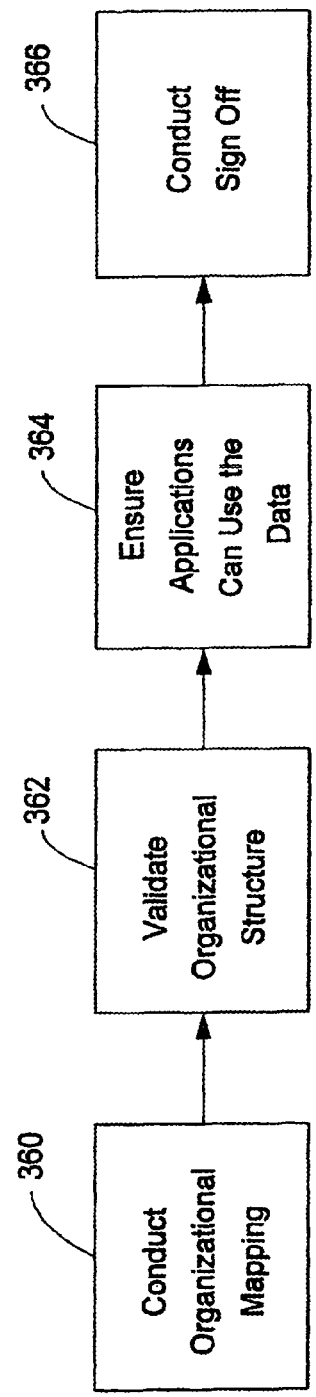
FIG. 13 illustrates a process of creating organizational information using the organizational information system according to one embodiment of the present invention.

FIG. 13 illustrates a process of mapping an organization using the organizational information system 14 according to one embodiment of the present invention. The organization may be, for example, a business unit, group, etc. or an entire corporation, entity, etc. that desires to use the system 10. At step 360, the organization is mapped into the organizational information system 14 by first defining the organization in terms of job activities and responsibilities. The organization is modeled in such a way that the organizational information system 14 can provide a centralized source of role and coverage data that is available to applications, users, etc. that use the system 10.

At step 362, the organizational structure is validated to confirm that the structure (including assignment of roles and coverage) conforms to various standards that the organizational data must follow. In one embodiment, steps 360 and 362 can be combined into one operation.

At step 364, a check is made to ensure that applications can use the organizational data that was created at step 360. At step 366, the organizational data is signed off on by, for example, administrators of the system 10, application owners, etc.

Figure 14:
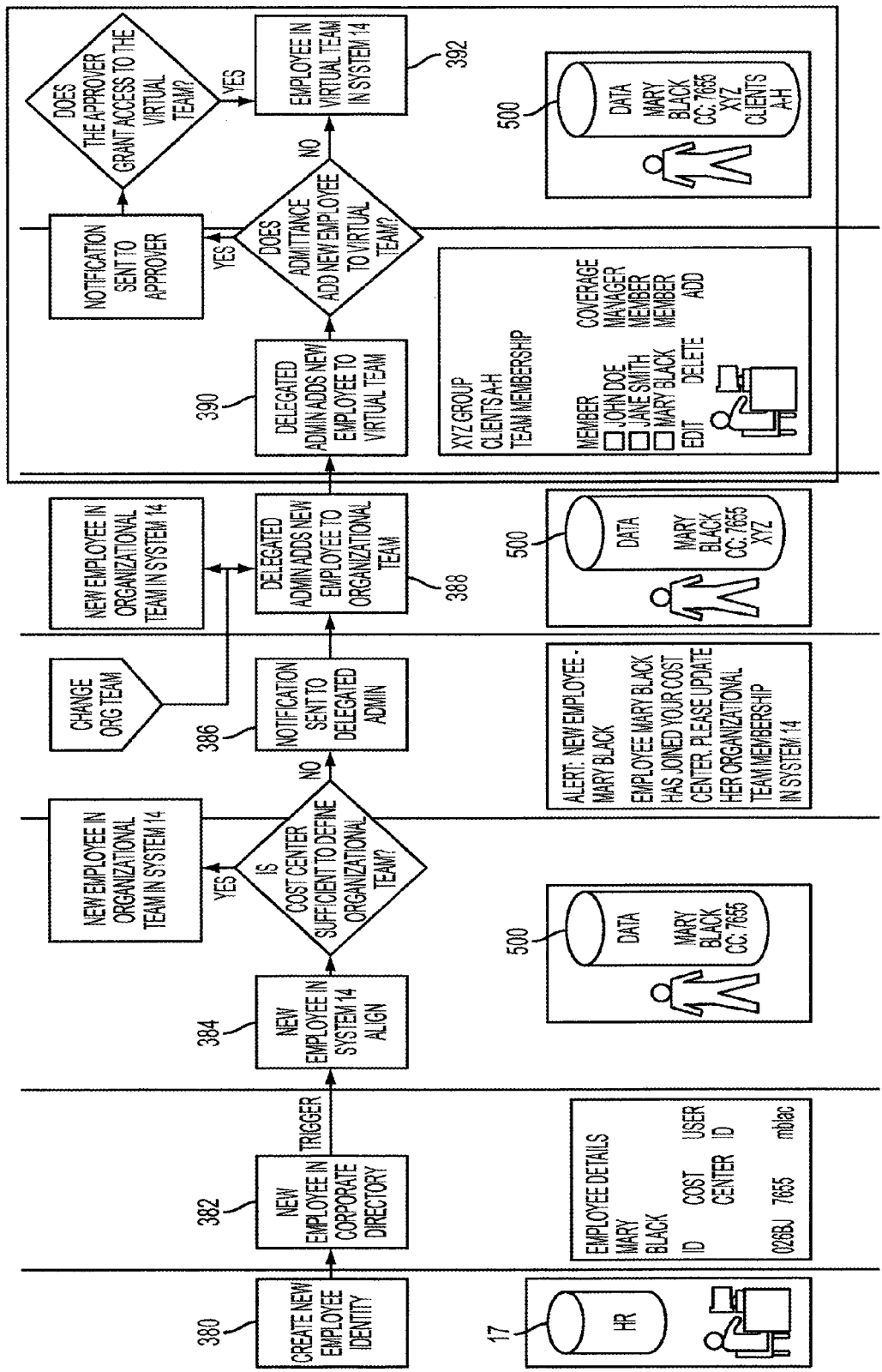
FIGS. 14 through 22 illustrate examples of use of the system of FIG. 1 according to various embodiments of the present invention.

FIGS. 14 through 22 illustrate examples of use of the system 10 of FIG. 1 according to various embodiments of the present invention. FIG. 14 illustrates an embodiment in which a new employee is added to the organizational information system 14. In the embodiment, a new employee, "Mary Black," has joined an organization and will be working in the XYZ group within the organization. At step 380, a new identity is added for Black in the HR database 17. The identity information includes Black's name, cost center and employee ID.

At step 382, Black's identity is added to the firmwide directory 20. At step 384, Black's identity is published to the organizational information system 14 and the identity is added to the organizational information and Black is aligned with her cost center. The update in the organizational information triggers a notification to the delegated administrator that is responsible for the cost center with which Black is associated at step 386. At step 388, the delegated administrator adds Black to the correct organization team (XYZ Group) and her role and coverage capacity are defined.

At step 390, the delegated administrator adds Black to a virtual team that covers clients A-H. As can be seen, admittance to various teams may require approval by an additional approver. At step 392, Black is now a member of client A-H virtual team in the organizational information system 14. In various embodiments, steps 390 and 392 may be repeated as necessary.

Figure 15:
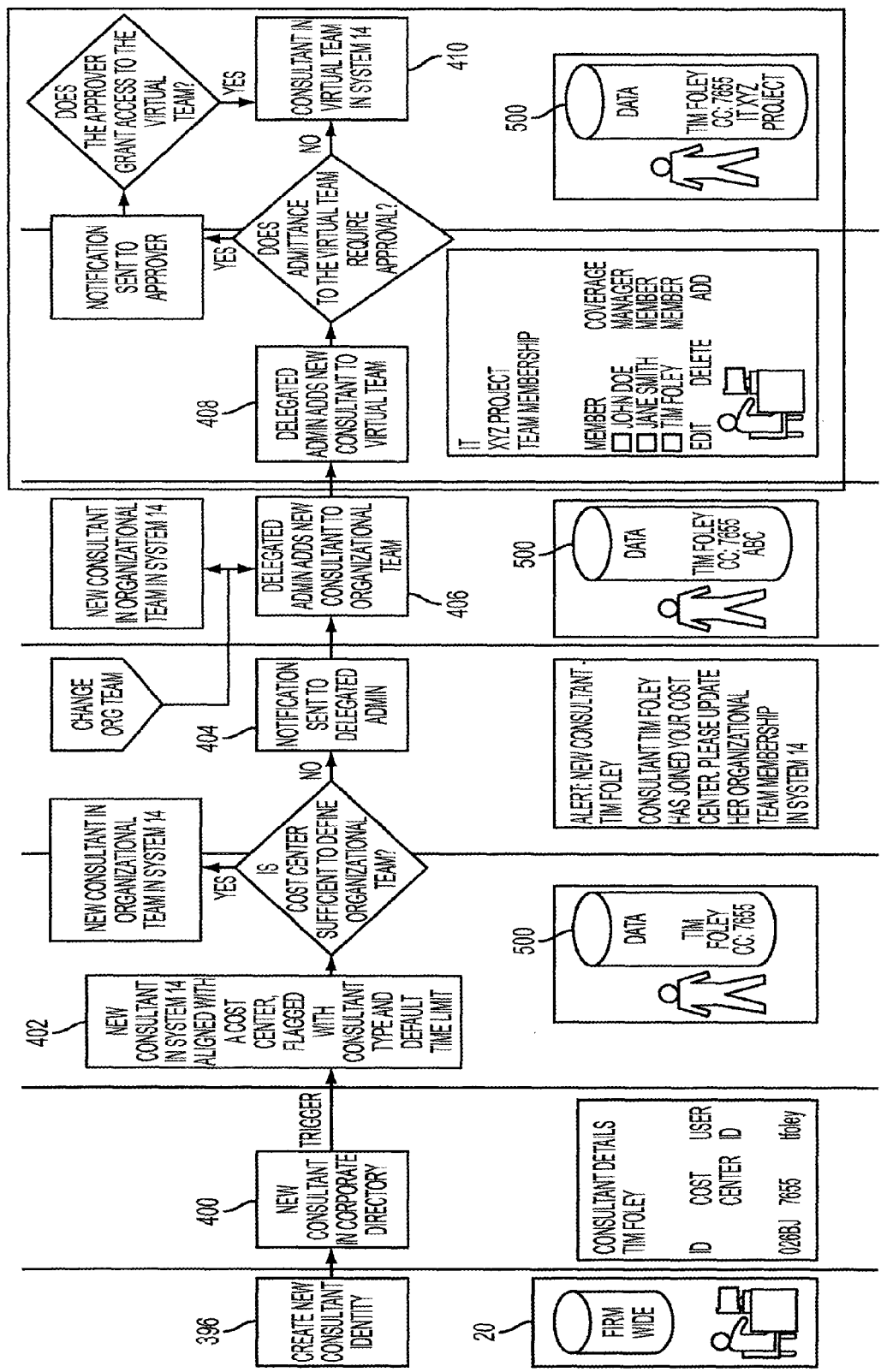

FIG. 15 illustrates an embodiment in which a contingent worker (e.g., a consultant) is added to the organizational information system 14. At step 396, a consultant with ABC Corp., "Tim Foley," is added to the firmwide directory 20. At step 400, the existence of an identity in the firmwide directory 20 has triggered creation of an identity in the firmwide directory 20 in which Foley is identified as a consultant.

At step 402, upon completion of an identity in the firmwide directory 20, the identity is published to the organizational information system 14. Foley is aligned with the appropriate cost center in the organizational information and is flagged as a consultant. In one embodiment, because Foley is a consultant, his identity in the organizational information system 14 automatically expires after a predetermined period of time and manual intervention is required to extend residence of the identity in the organizational information system 14.

At step 404, the update in the organizational information system 14 triggers a notification to the delegated administrator that is responsible for the cost center with which Foley is associated. At step 406, the delegated administrator adds Foley to the ABC organizational team in the organizational information system 14. In one embodiment, an expiration date of Foley's membership in the team can be set. At step 408, the delegated administrator adds Foley to the appropriate virtual team (i.e. the XYZ team). As can be seen, admittance to various teams may require approval by an additional approver. At step 410, Foley is now a member of the XYZ project virtual team in the organizational information system 14. In various embodiments, steps 408 and 410 may be repeated as necessary.

Figure 16:
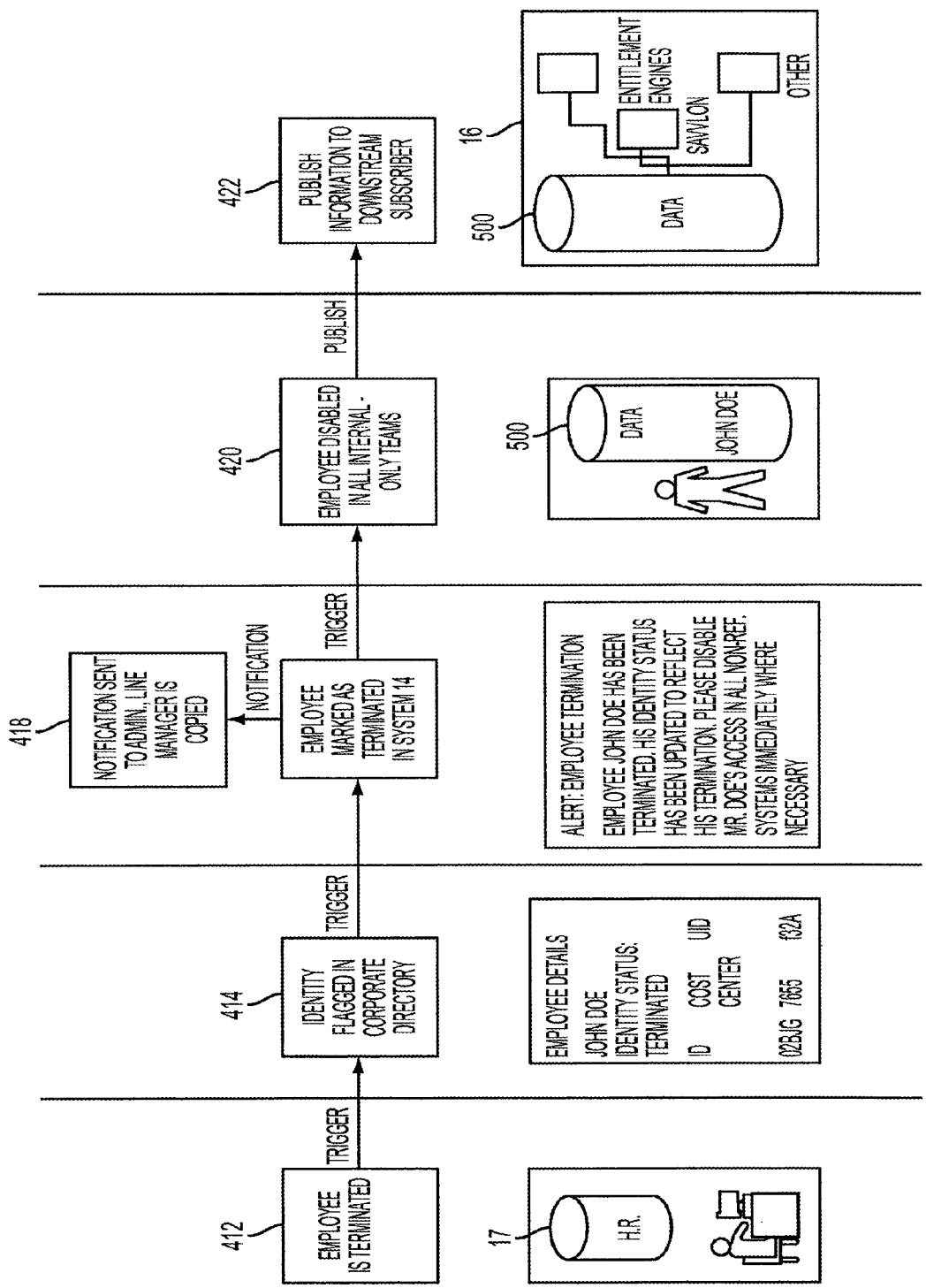

FIG. 16 illustrates an embodiment in which an employee is terminated and thus deactivated, or marked as terminated, in the organizational information system 14. As can be seen in FIG. 16, an employee, "John Doe," is terminated and his identity is updated to "terminated" in the HR database 17 at step 412. At step 414, Doe's identity is changed in the firm-wide directory 20 to indicate that he has been terminated.

At step 416, the organizational information system 14 is triggered to mark Doe's identity as terminated. At step 418, the central administrator and the delegated administrator responsible for the cost center with which Does is associated are alerted of Doe's termination. In one embodiment, other individuals (e.g., line managers, etc.) are also notified of Doe's termination so that appropriate steps may be taken (e.g., disable Doe's access to certain resources, provide coverage for Doe's former responsibilities, etc.).

At step 420, Doe is disabled with respect to all teams in the organizational information system 14. At step 422, Doe's termination is published to other systems such as, for example, the entitlements engine 16.

Figure 17:
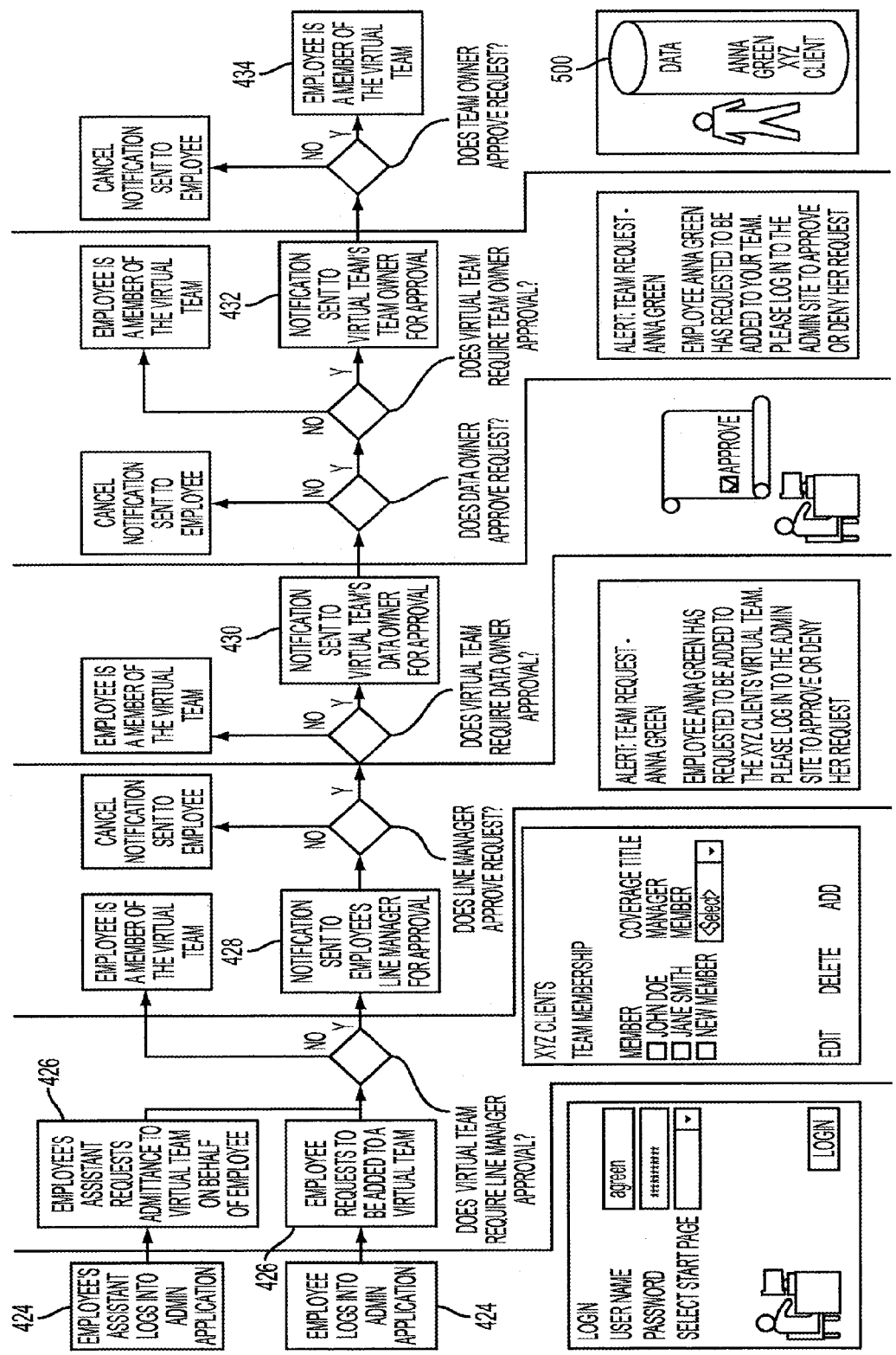

FIG. 17 illustrates an embodiment in which an employee requests, and is granted, admittance to a virtual team in the organizational information system 14. At step 424, an employee, "Anna Green," or the employee's assistant, logs into an organizational information system administration function to update her team membership. At step 426, either Green or her assistant request to be added to the XYZ client virtual team. If, as is the case in FIG. 17, such an addition requires approval (e.g., line manager approval), a notification is given to that effect to the employee (or the employee's assistant).

At step 428, notification is sent to Green's line manager requesting approval for Green to be added to the XYZ client team. If, as is the case in FIG. 17, the line manger grants such approval and further approvals are necessary, at step 430 a notification is sent to the virtual team's data owner. If, as is the case in FIG. 17, the virtual team's data owner grants approval, notification is sent to the virtual team's team owner requesting approval at step 432. At step 434, if the virtual team's team owner grants approval, Green is added as a member of the XYZ client virtual team in the organizational information system 14.

As can be seen in FIG. 17, various notifications may be sent to a requesting employee if approval is denied at various levels. Also, the process allows for varying levels of approval when, for example, less than two levels of approval are needed to allow an employee to update team membership.

Figure 18:
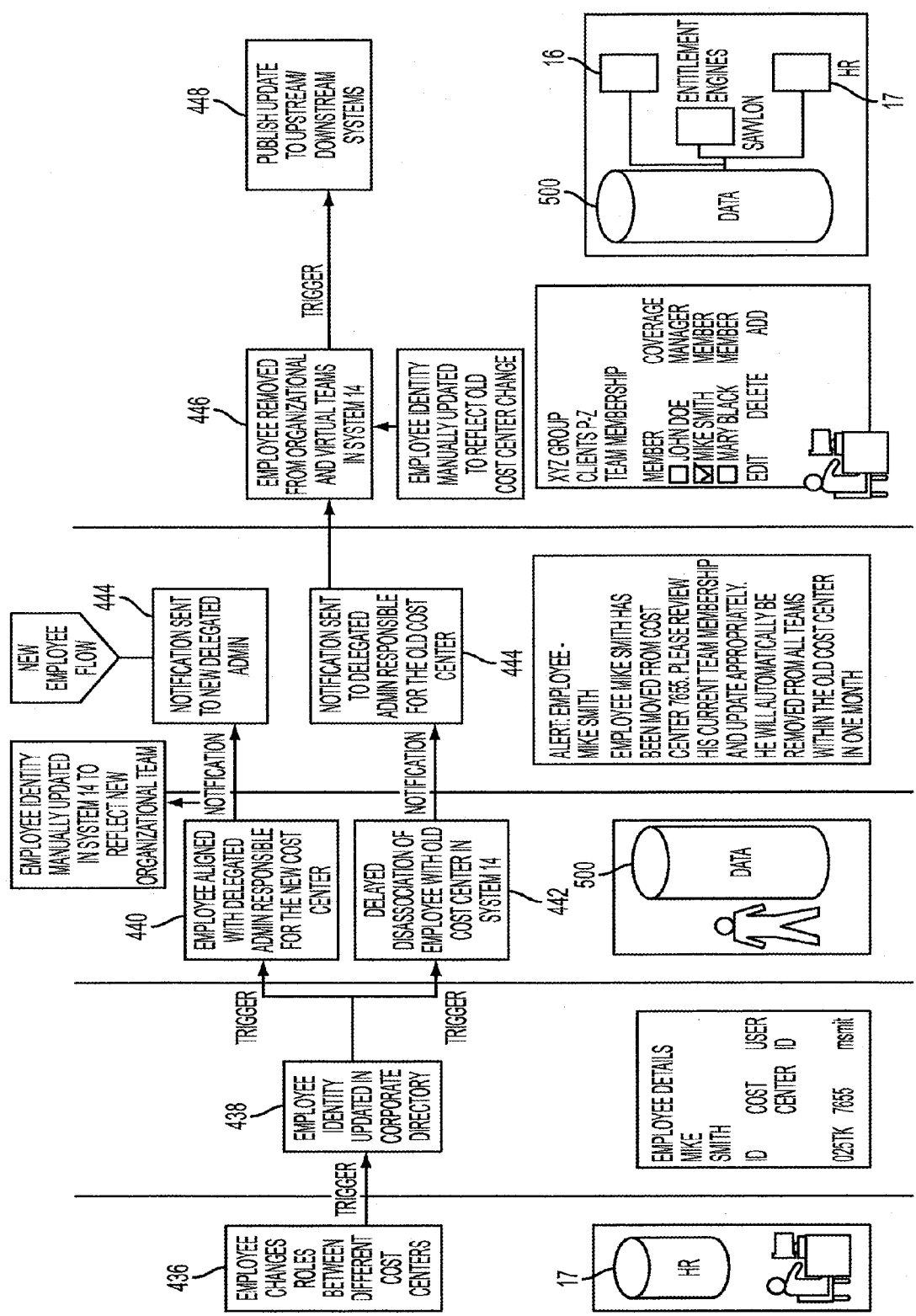

FIG. 18 illustrates an embodiment in which an employee makes an organizational change in the organizational information system 14. At step 426 an employee, "Mike Smith," has changed roles. The changed information for Smith is updated in the HR database 17. At step 438, the update of the HR database 17 triggers an update to the firmwide directory 20. At step 440, the organizational information system 14 is updated to reflect the new cost center for Smith. At step 442, a delayed disassociation of Smith with the former cost center occurs in the organizational information system 14.

At step 444, the delegated administrator of Smith's new cost center and the delegated administrator of Smith's former cost center are sent notifications that Smith will be disassociated with the former cost center. At step 446, Smith has been removed from all teams associated with the former cost center in the organizational information system 14 and, in one embodiment, Smith is notified of his removal from such teams.

At step 446, changes regarding Smith in the organizational information system 14 are published to, for example, down-stream and upstream applications and systems that utilize the organizational information system 14. In one embodiment, if a cost center change is updated in the organizational information system 14 before it is updated in the HR database 17, the organizational information system 14 will publish the change to the HR database 17.

Figure 19:
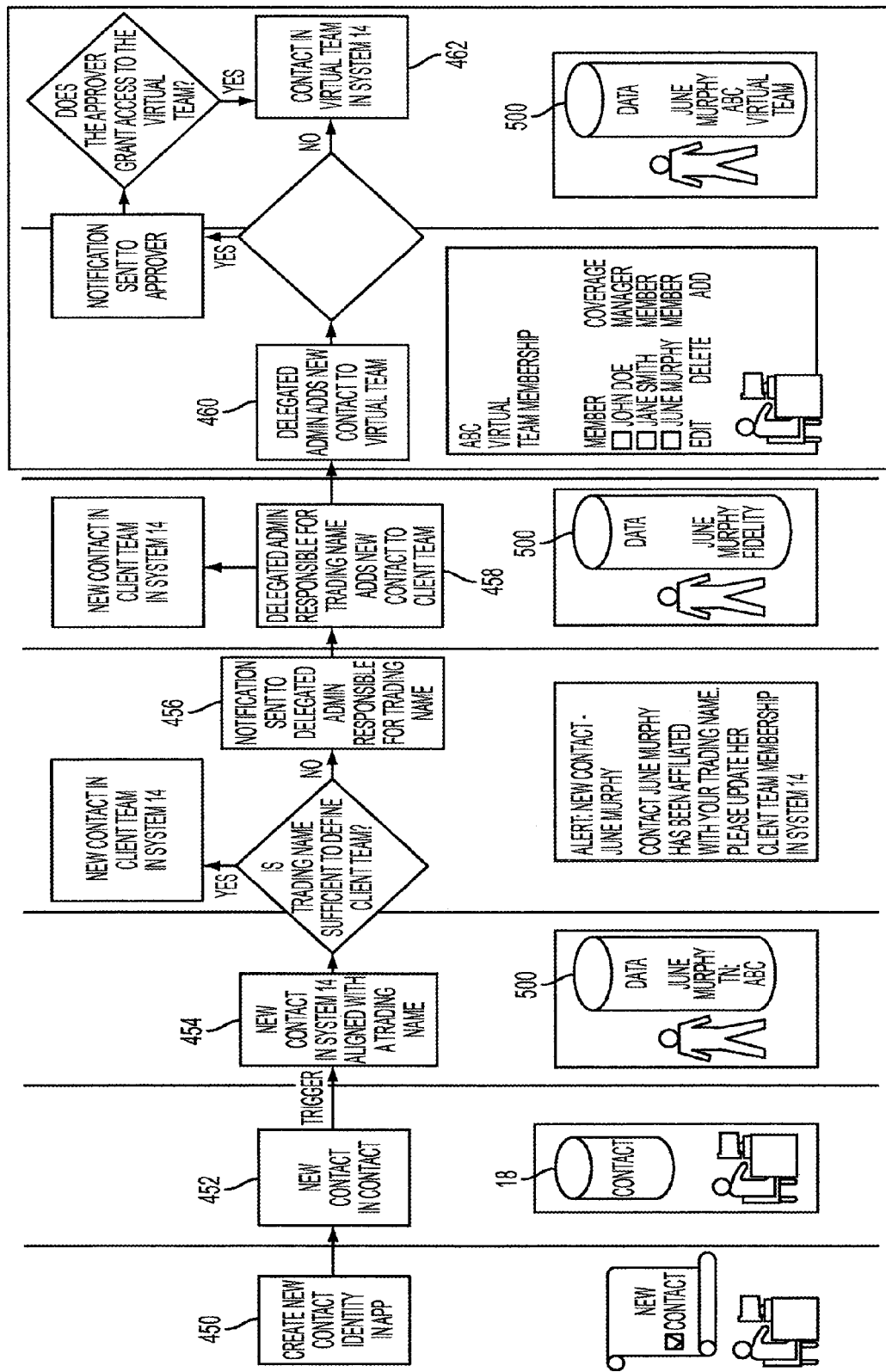

FIG. 19 illustrates an embodiment in which a new client contact is added in an application. At step 450, a new contact, "June Murphy," is added as a contact at ABC Corp. in an application. At step 452, Murphy is added as a contact in the contact database 18. At step 454, Murphy is aligned with the ABC Corp. in the organizational information system 14. At step 456, notification is sent to the delegated administrator that is responsible for the ABC Corp. In one embodiment, the relationship manager for the ABC Corp. relationship is also notified.

At step 458, the delegated administrator adds Murphy to the ABC Corp. client team in the organizational information system 14. At step 460, the delegated administrator adds Murphy to the ABC Corp. virtual team in the organizational information system 14. At step 462, Murphy is now a member of the ABC Corp. virtual team in the organizational information system 14. In various embodiments, steps 460 and 462 may be repeated as necessary.

Figure 20:
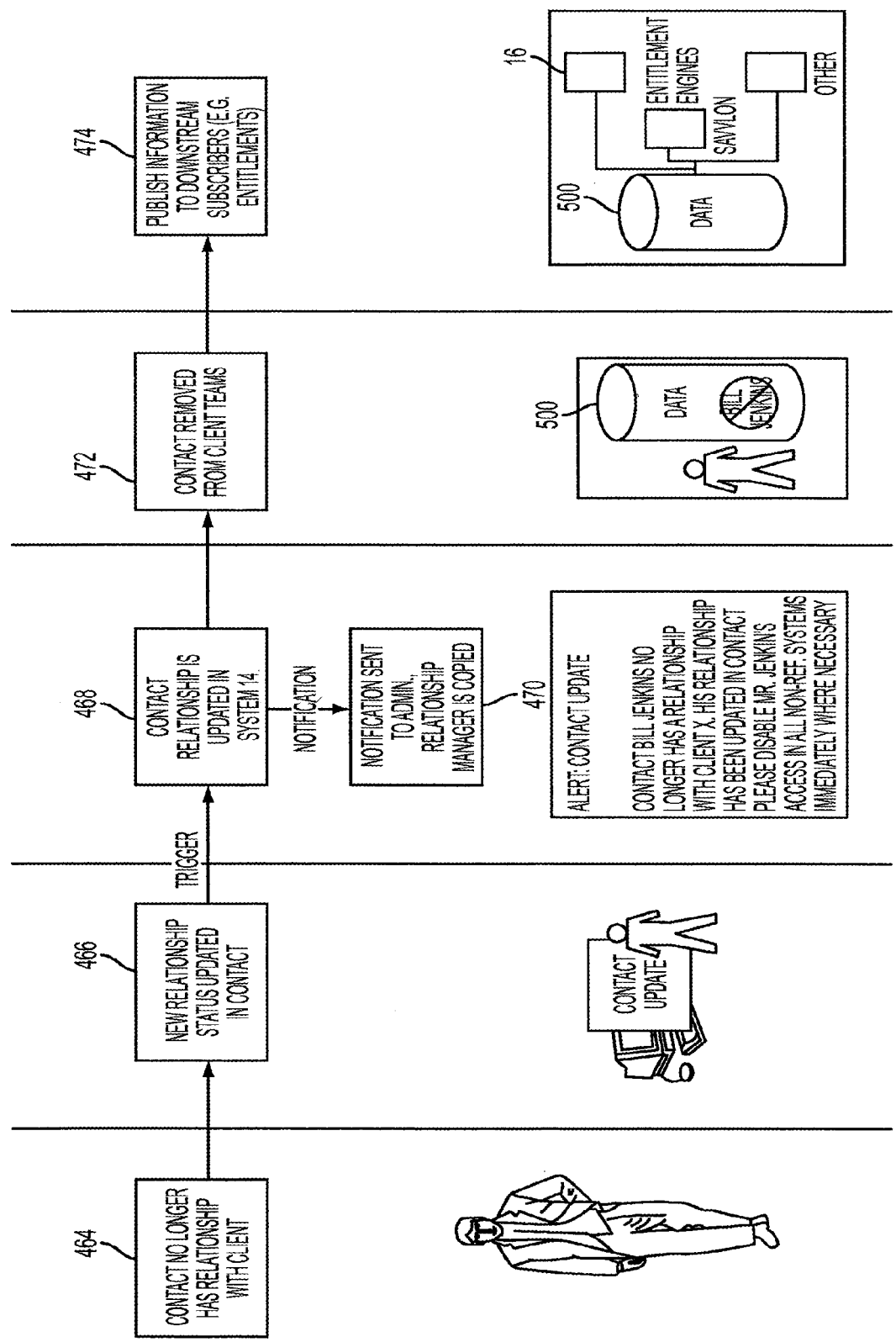

FIG. 20 illustrates an embodiment in which a contact's relationship with a client is terminated. At step 464, a contact, "Bill Jenkins," no longer has a relationship with client X, because, for example, his employment has been terminated or he has resigned. At step 466, the contact database 18 is updated to remove Jenkins' affiliation with client X. At step 468, the contact information for Jenkins is updated in the organizational information system 14 and at step 470, notification of the update is sent to the delegated administrator for client X and the relationship manager for client X.

At step 472, Jenkins is removed from all teams in the organizational information system 14. At step 474, the update to the organizational information system 14 is published to downstream systems and applications such as, for example, the entitlements engine 16.

Figure 21:
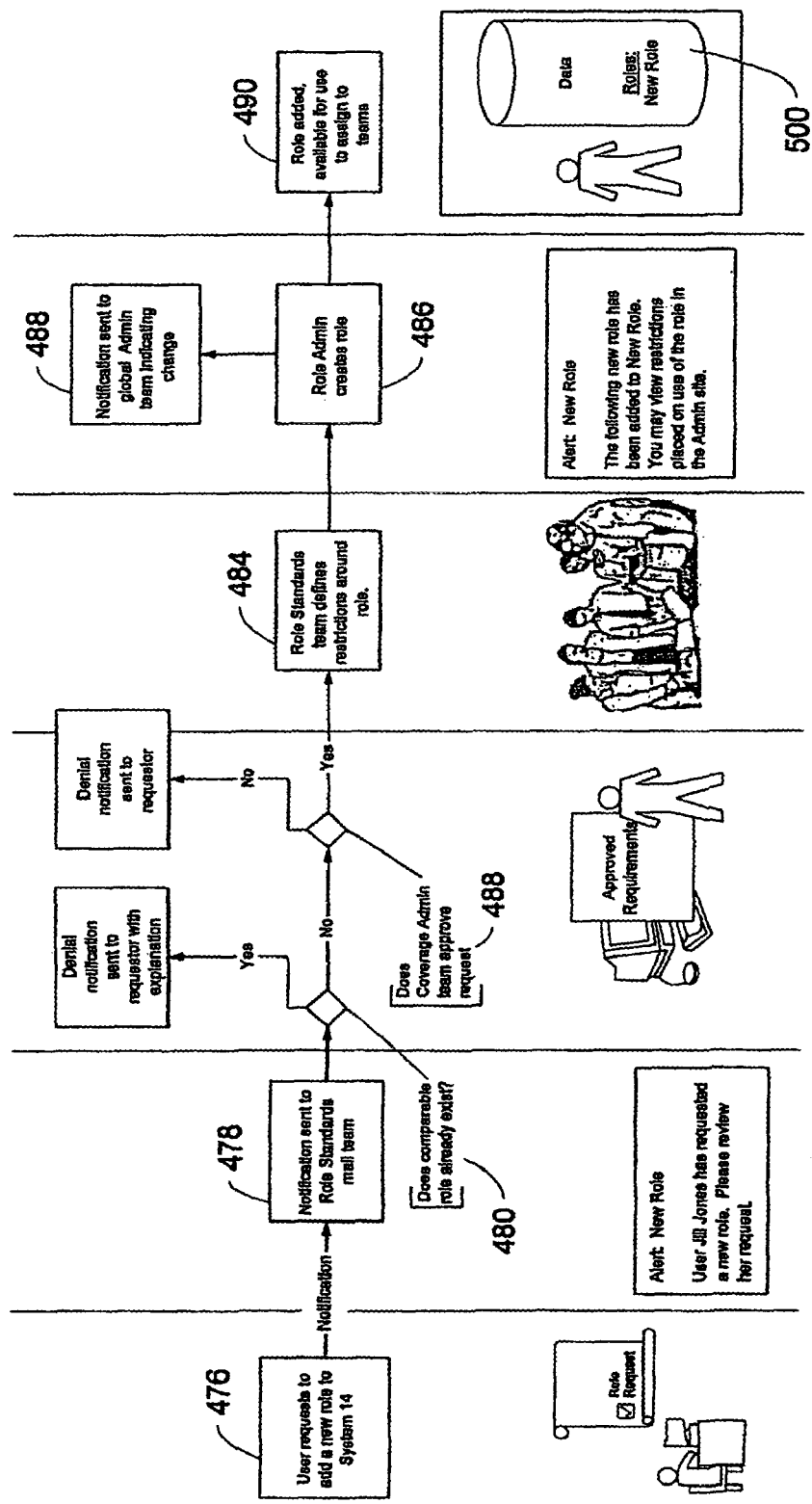

FIG. 21 illustrates an embodiment in which a new role is requested and added to the organizational information system 14. At step 476, a user, "Jill Jones," requests that a new role be added for use by teams in the organizational information system 14. At step 478, a notification of Jones' request is sent to a role standards team. The role standards team is responsible for reviewing all requests to modify existing roles, create new roles, and delete invalid roles.

At step 480, the role standards team confirms that no comparable role already exists and at step 482 approves addition of the new role. At step 484, the role standards team defines various restrictions relating to the new role. At step 486, the role administrator creates the role and at step 488, notification is sent to a global administrative team to alert the team of the existence of the new role. At step 490, the new role is available in the organizational information system 14.

Figure 22:
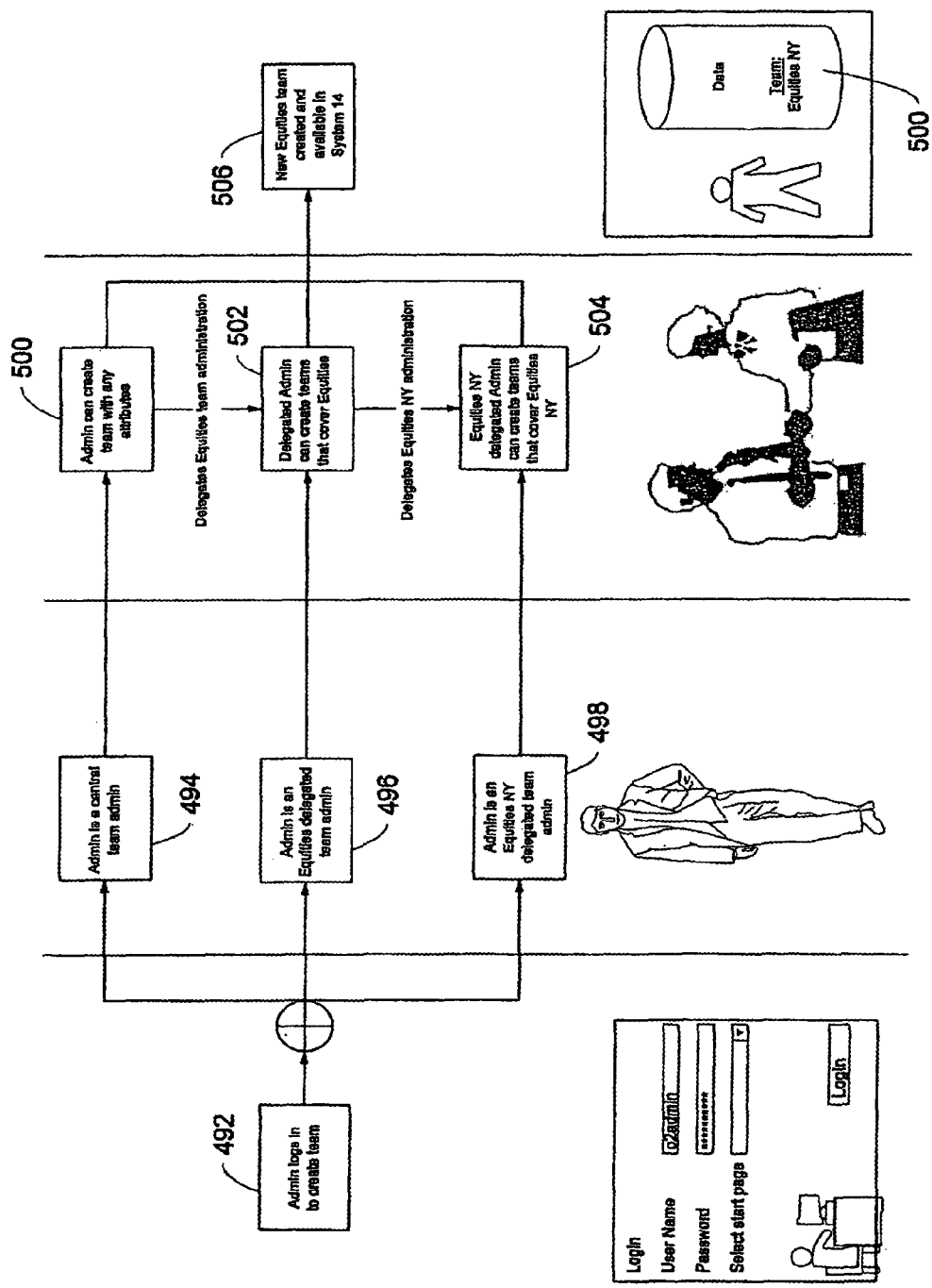

FIG. 22 illustrates an embodiment in which a new team is added to the organizational information system 14. At step 492, an administrator logs into maintenance service 96 to create the team. The administrator may be a central team administrator 494, a delegated team administrator for a team (e.g., the "Equities" team) 496, or a delegated team administrator for a sub-team (e.g., the "Equities NY" team) 498. The central team administrator 494 has the ability to create any team with any attributes. The delegated team administrator for a team 496 has the ability to create any team covering the team and any sub-teams. The delegated administrator for a sub-team 498 has the ability to create teams covering the sub-team. Such abilities are shown at steps 500, 502, 504. At step 506, the new team is created in the organizational information system 14.

Figure 23:
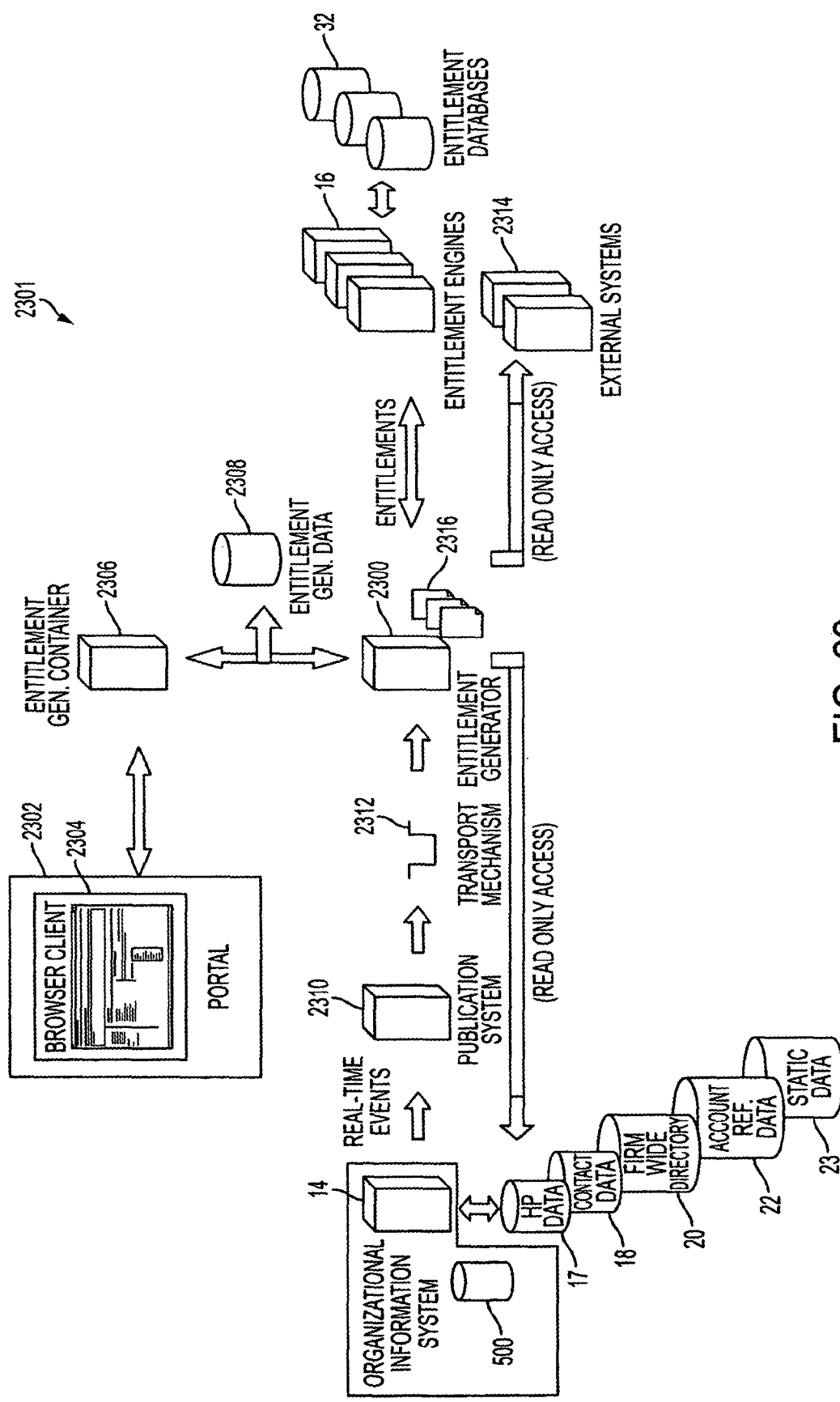
FIG. 23 is a diagram illustrating a system having an organizational data and entitlement platform according to one embodiment of the present invention.
Figure 24:
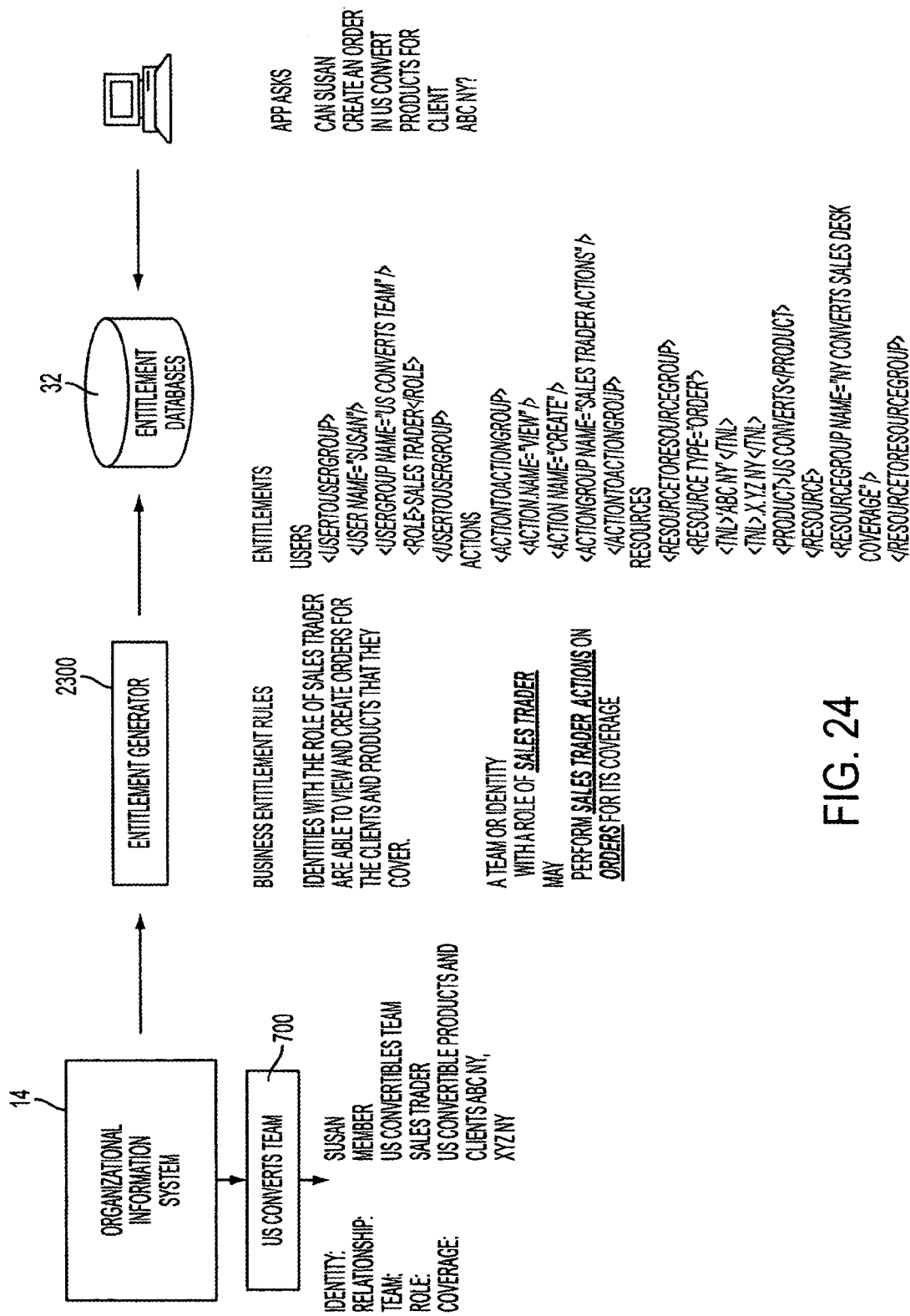
FIG. 24 is a diagram illustrating an example of controlled access to a secured function using the system of FIG. 23 according to one embodiment of the present invention.

FIG. 23 is a diagram illustrating a system 2301 having an organizational data and entitlement platform according to one embodiment of the present invention. As shown in FIG. 24, an entitlement generator 2300 allows for the maintenance and reporting of business entitlement rules in a human-readable language and provides a translation of the rules into executable code that can be deployed and that can subscribe to reference data changes and generate entitlements in real time. The entitlement generator 2300 may be implemented in, for example, Java.

A portal 2302 in the system 2301 includes a browser client 2304 that permits a user to, for example, create business entitlement rules, perform entitlement modeling, perform system administrative functions, predict the impact of changing a business entitlement rule before the rule is changed, generate reports, etc. A entitlement generator container 2306 provides a runtime environment for Internet (web) services such as, for example, an entitlements model definition service, a rules authoring service, a reporting and auditing service, a rule generation and deployment service, an authorization and entitlement service, etc. The entitlement generator container 2306 may be, for example, an Apache Tomcat container.

Entitlement generator data 2308 may be meta data that relates to entitlement models. The entitlement generator 2300 may subscribe to events from the organizational information system 14 that are published by a content based publication system 2310 via a transport mechanism 2312. The entitlement generator 2300 may have read only access to various databases, including, but not limited to, the HR data database 17, the contact data database 18, the firm wide directory 20, the account reference data database 22, and other reference databases 23.

The entitlement generator 2300 communicates rules sets 2316 as entitlements information to the entitlements engines 16. In various embodiments the system 2301 may include one entitlements engine 16 and one entitlements data database 32 for each rules set 2316. The entitlement generator 2300 may have read only access to various external systems 2314. The entitlement generator 2300 may use data from the external systems 2314 to obtain data necessary for generating entitlements. Examples of external systems include an LDAP directory 2550, the firm wide directory 20, the contact data database 18, etc.

In various embodiments the entitlement generator 2300 may operate in either batch mode or in real-time mode. In real-time mode, the entitlement generator 2300 "listens" for real-time events that are published by the organizational information system 14. The entitlement generator 2300 communicates the events to all rules sets 2316 that have been deployed. The rules sets 2316 invoke a transformation in the generator 2300 that transforms the events to create entitlements and communicates the entitlements to the entitlements engines 16.

In batch mode, the entitlement generator 2300 retrieves and stores relevant data from the databases 17, 18, 20, 22 and/or 23. Relevant data may include, for example, roles, teams, coverage attributes, etc. The entitlement generator 2300 creates a simulated batch event for each team relationship that was retrieved and stored and communicates the batch events to the relevant rules sets 2316. The rules sets 2316 invoke a transformation in the generator 2300 that creates an image of the entitlements. An entitlements comparator in the entitlement generator 2300 compares the image with actual entitlements and communicates any differences to the entitlements engines 16. The entitlement generator 2300 may operate in batch mode, for example, during an initial load when an application goes on line and entitlements need to be calculated, when a rule is changed, deleted, or added so that the impact of the change, deletion, or addition may be gauged, or during regular backups to make sure that no events are missed when the entitlement generator 2300 is operated in real-time mode.

In various embodiments, the entitlement generator 2300 may utilize three types of rules.

Business Entitlement Rules may define what entitlements are to be generated for different domains. The business entitlement rules may be implemented in, for example, the ILog JRules Business Action Language (BAL).

Template Rules may define how the entitlements are generated. Template rules may be common across a number of domains and specify low level details such as actions to be taken in response to various source events. The template rules may provide a standard mapping between data from the organizational information system 14 and the entitlements engines 16.

Execution Rules are auto-generated instances of template rules, customized with domain specific elements from business entitlement rules. The execution rules are executed by the entitlement generator 2300. The execution rules may be implemented in, for example, the ILog JRules IRL language.

In various embodiments, the business entitlement rules and the execution rules may be expressed in terms of the following constructs:

If <premise> then <consequence> [else <antecedent>]

where,

| | |
|---|---|
| Premise | Is the rule condition expression. The entitlement generator 2300 may create a decision tree consisting of the various conditions and optimize the evaluation of these conditions. When an object is inserted or removed in the working memory the condition nodes are evaluated to determine their outcome. |
| Consequence | Is the action taken if the condition evaluates to true. Consequences may have any kind of sequential statements within them (such as sequence, condition or iteration). These statements do not form further rules for the entitlement generator's 2300 environment but are statements to be executed in, for example, the entitlement generator's 2300 programming language or as Java commands. |
| Antecedent | Is the action taken if the condition evaluates to false. |
| Priority | Rules have a priority and all things being equal the rules with higher priority get a first chance at rule execution |

In various embodiments, rules may be created and deployed using the steps of: (1) defining the template rules; (2) defining the business entitlement rules; (3) generating the execution rules; and (4) deploying the execution rules. The following example illustrates the different types of rules:

```
Business Entitlement Rule:
If
    the organizational unit has a role of Trade Allocation Risk Manager
then
    the organizational unit may view trade
Template Rule:
when
{
    ?sourceEvent: ISourceEvent( );
    ?ruleResult:RuleResult( );
    evaluate(!(?sourceEvent.predicateRemoveEvent( )));
}
then
{
    ?ruleResult.setSourceEvent(?sourceEvent);
    ?transformationService.transform(?sourceEvent, ?ruleResult,
    ?executionContext);
    ?context.retract(?sourceEvent);
    while (?sourceEvent.hasQueuedEvents( ))
    {
        ISourceEvent ?queuedEvent = (ISourceEvent)
        sourceEvent.dequeueExecutionEvent( );
        ?context.insert(queuedEvent);
    }
}
Execution Rule:
when
{
    ?context: IlrContext( ) from ?context;
    ?sourceEvent: ISourceEvent( );
    ?iOrgUnitRule: ISourceEvent( );
    evaluate((!(?sourceEvent.predicateRemoveEvent( ))) &&
        ((?iOrgUnitRule.predicateRole("Trade Allocation Risk Manager"))));
}
then
{
    ?iOrgUnitRule.consequenceEntitlementAR("View", "Trade");
    ?ruleResult.setSourceEvent(?sourceEvent);
    ?transformationService.transform(?sourceEvent, ?ruleResult,
    ?executionContext);
    ?context.retract(?sourceEvent);
    while (?sourceEvent.hasQueuedEvents( ))
    {
        ISourceEvent ?queuedEvent = (ISourceEvent)
        sourceEvent.dequeueExecutionEvent( );
        ?context.insert(queuedEvent);
    }
}
```

FIG. 24 is a diagram illustrating an example of controlled access to a secured function using the system 2301 of FIG. 23 according to one embodiment of the present invention. In the example, the organizational information system 14 includes a US convertibles team 700. The convertibles team 700 includes information that Susan has the role of sales trader for US convertible products and for clients ABC NY and XYZ NY. The entitlement data 32 from the entitlement generator 2300 is thus that Susan has the role of sales trader and she can view and create the resources of NY convertible sales desk orders.

In the example shown in FIG. 24, when an order entry application asks: "Can Susan create an order in US convertible products for client ABC NY?" the entitlement engine 16 will answer in the affirmative.

Figure 25:
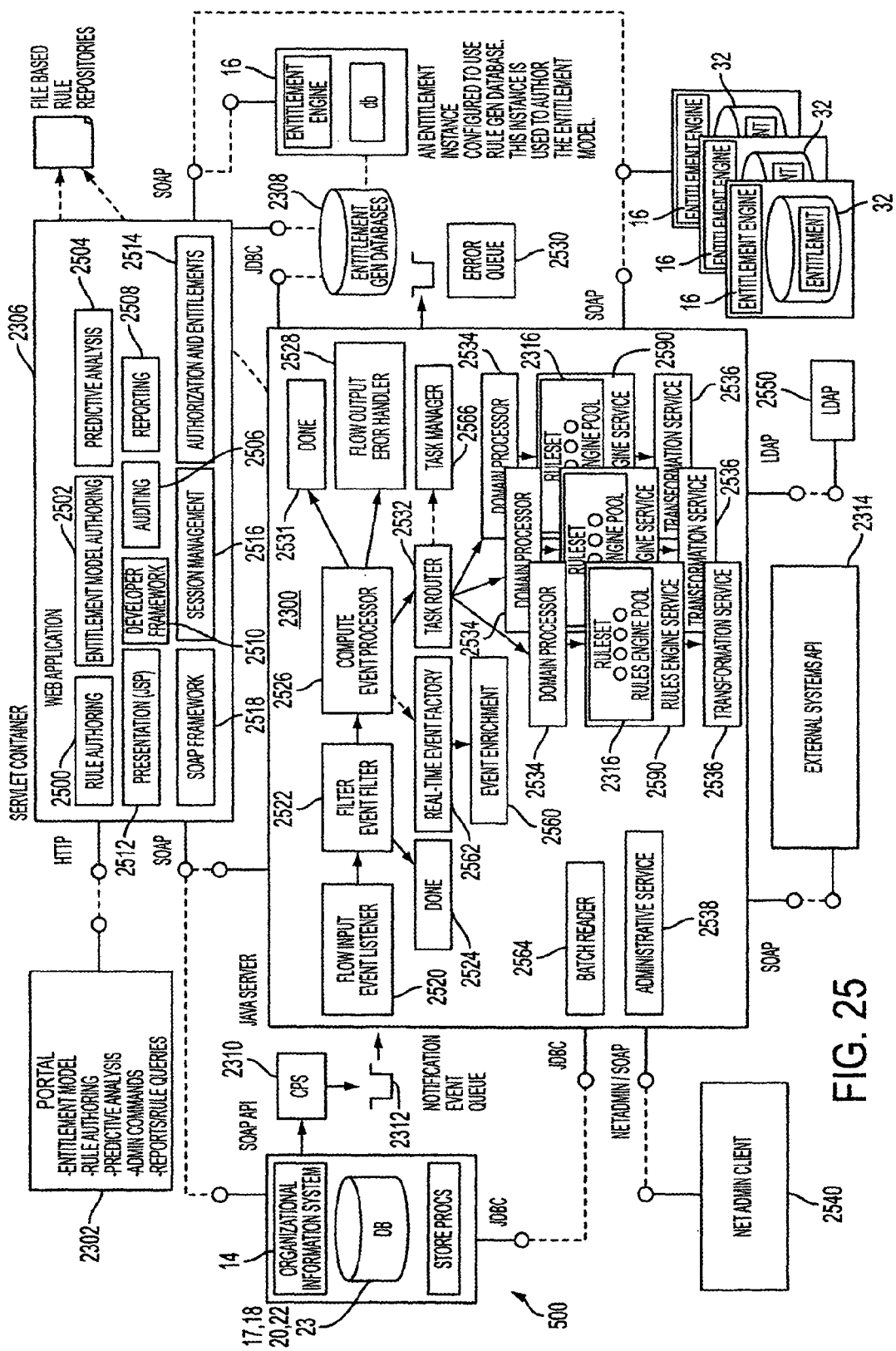
FIG. 25 is a diagram illustrating an embodiment of the system of FIG. 23 configured for real-time processing.

FIG. 25 is a diagram illustrating an embodiment of the system 2301 of FIG. 23 configured for real-time processing. As can be seen in FIG. 25, the entitlement generator container 2306 includes various modules that a user of the portal 2302 may use, for example, generating entitlement models, authoring rules, performing predictive analyses, entering administrative commands, and generating reports and conducting rules queries. The modules of the entitlement generator container 2306 include a rule authoring module 2500 that enables writing and management of high level rules. The entitlement generator container 2306 also includes an entitlement model authoring module 2502 that enables creation and maintenance of entitlement models and the mapping of entitlement resources to their corresponding data resources. A predictive analysis module 2504 enables a predictive analysis of the impact of rules changes. An auditing module 2506 enables generation of an audit trail of actions that are performed by users of the entitlement generator 2300. A reporting module 2508 may be used to generate reports based on rules selected by a user.

A developer framework 2510 in the entitlement generator container 2306 may be implemented in, for example, Apache Struts. A presentation module 2512 may be, for example, a Java server page module that generates content (e.g., HTML pages, XML pages, etc.) in response to a user request. An authorization and entitlements module 2514 governs user access to various features of the portal 2302. A session management module 2516 keeps track of user activity across relating to the portal 2302. A SOAP framework 2518 is used to allow users to access the external systems 2314.

The entitlement generator 2300 includes an event listener 2520 that acts as a subscriber to the transport mechanism 2312. An event filter 2522 filters out unwanted messages and sends such events to node 2524. An event processor 2526 converts input messages to, for example, a Java SourceEvent object. If the event processing in the event processor 2526 fails, an error handler 2528 may publish an error message to an error queue 2530. Successful execution of an event and successful end of processing for that event is indicated at 2531.

A task router 2532 invokes multiple threads to invoke domain processors 2534 so that parallel execution may be achieved. Transformation services 2536 transform the rulesets 2316 to create entitlements. Event enrichment 2560 gathers additional information about the event that may be useful during execution of the event subsequently. A real-time event factory 2562 constructs, for example, a Java object implementing the ISourceEvent interface. The Java object encapsulates the input event and is used as an input to the rules engines 2590 to evaluate the rules. A batch reader 2564 reads the organizational information database 500 using, for example, a JDBC/stored procedure interface. A task manager 2566 maintains a list of tasks that can be invoked so that when a ruleset is deployed it is registered as a task in the task manager 2566. When it is needed to route the source event Java object the task router 2566 is supplied the list of tasks to which the source event must be routed to by the task manager 2566. An administrative service 2538 is an interface between a net administration client 2540 and the entitlement generator 2300. The service 2538 allows control of the event listener 2520 and allows rules to be deployed on the entitlement generator 2300.

Figure 26:
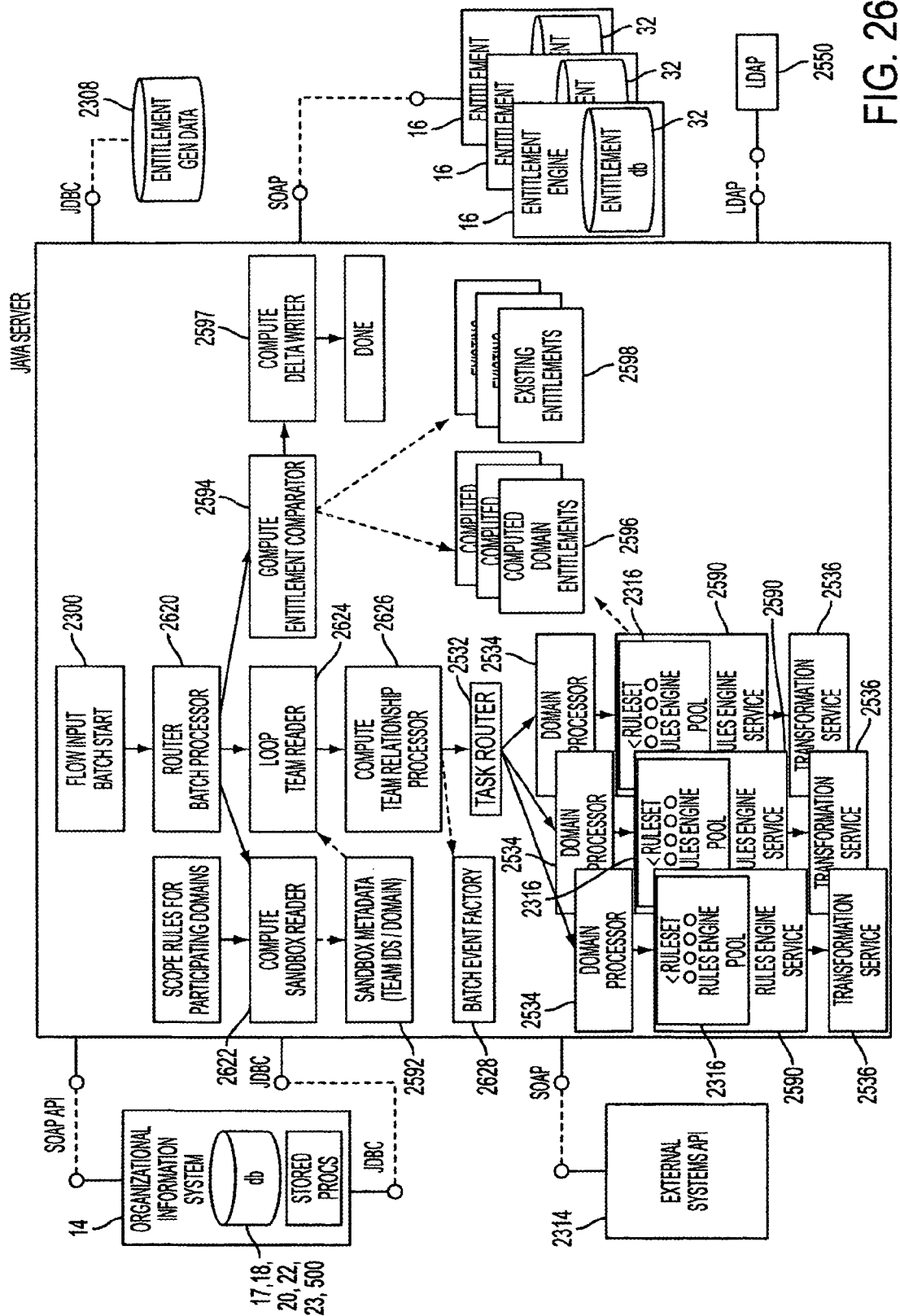
FIG. 26 is a diagram illustrating an embodiment of the system of FIG. 23 configured for batch processing.

FIG. 26 is a diagram illustrating an embodiment of the system 2301 of FIG. 23 configured for batch processing. A batch processor 2620 is responsible for directing the batch process. A sandbox reader 2622 reads the organizational information database 500 for team relationships that include the roles and coverages indicated by the scope rules, which are used to enable the sandbox reader 2622 to read only a subset of organizational information relevant to a specific domain (to prevent reading information that is of no use to a particular domain). Thus, the sandbox reader 2622 identifies what team relationships are needed to be processed for specific domains. A team reader 2624 loops on the output provided by the sandbox reader 2622 supplying each team relationship to a team relationship processor 2626.

The team relationship processor 2626 reads more details regarding the team relationships and constructs Java event objects using a batch event factory 2628. The batch event objects also implement the ISourceEvent interface and thus appear, to the rules engines 2590, exactly like the source event objects created during real-time processing. The task router 2532 routes the batch event objects to the various domain processors 2534 which invoke the rules engine 2590 to execute the rules on the batch events The transformation service 2536 computes an image of entitlements in memory for the batch events. When all the team relationships in sandbox metadata 2592 have been processed an entitlement comparator 2594 compares the computed entitlement image 2596 against the existing entitlements 2598 (if any) read from the entitlement instances. The comparator 2594 then computes any deltas that are aimed to correct any differences in the existing entitlements from the computed entitlements. A delta writer 2597 forms commands to an entitlements API and executes the commands, which serve to correct any differences in the existing entitlements 2598 from the computed entitlements 2596.

Figure 27:
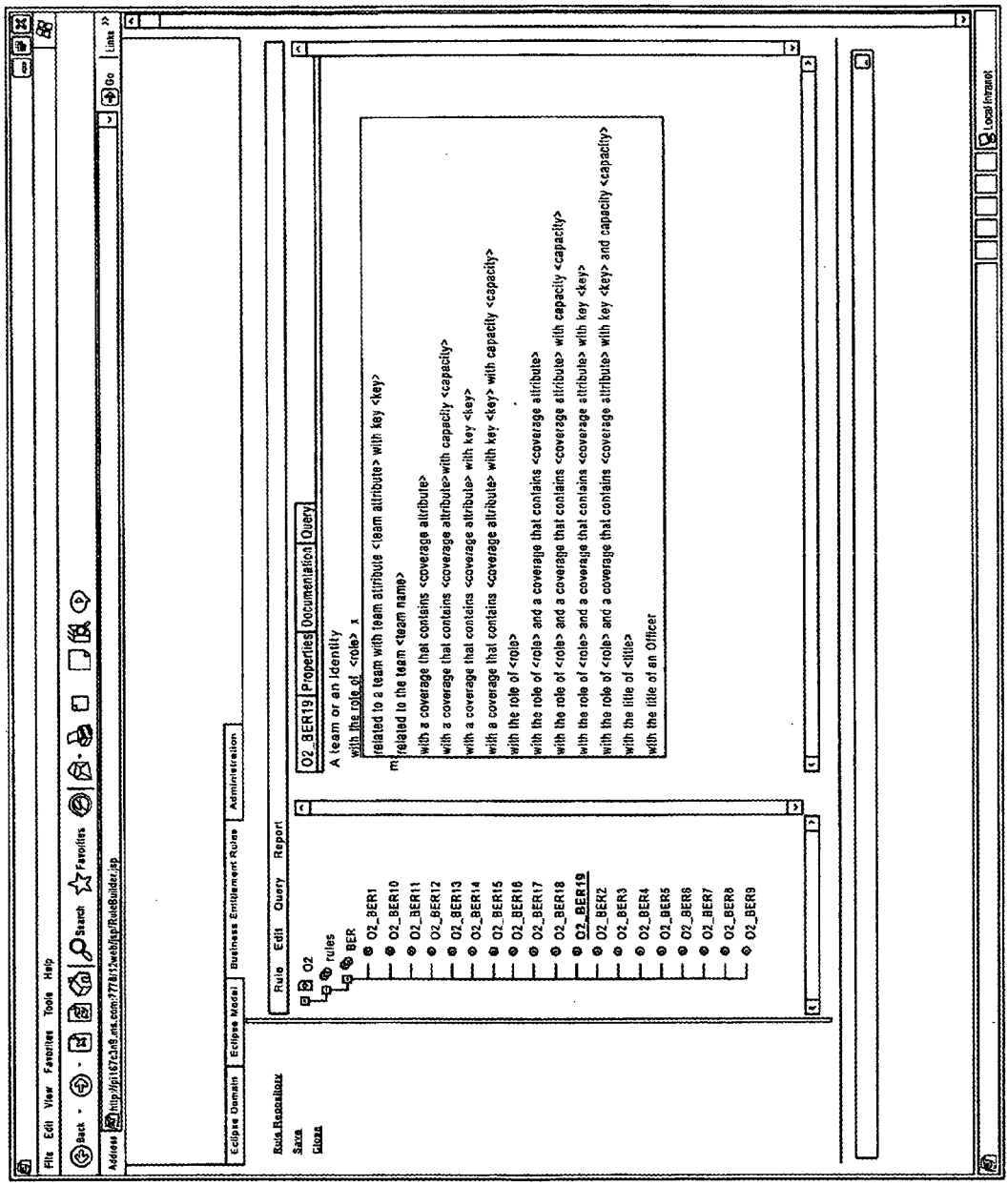
FIGS. 27 through 33 illustrate example screen printouts of an implementation of the system of FIG. 23 according to various embodiments of the present invention.
Figure 28:
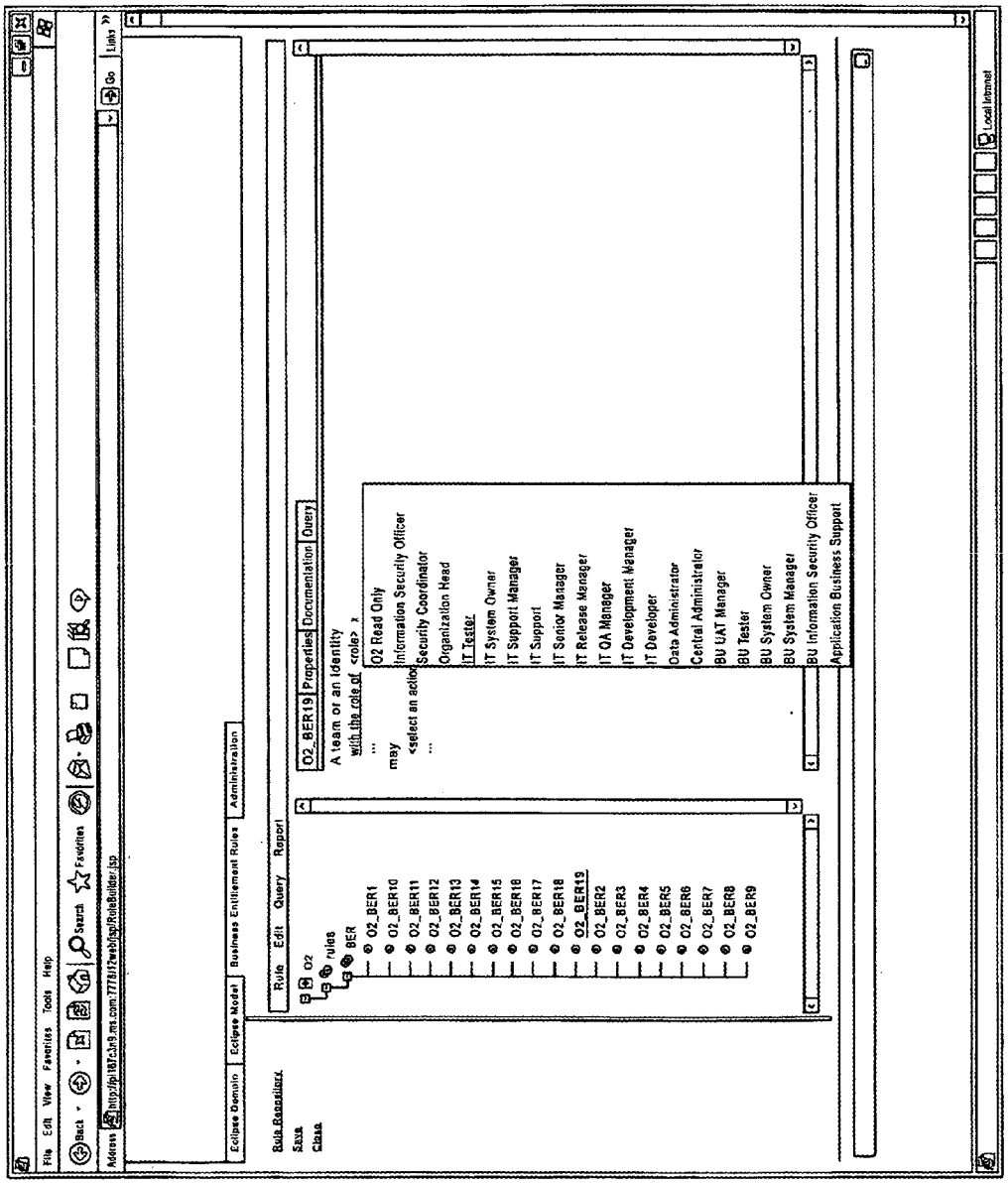
Figure 29:
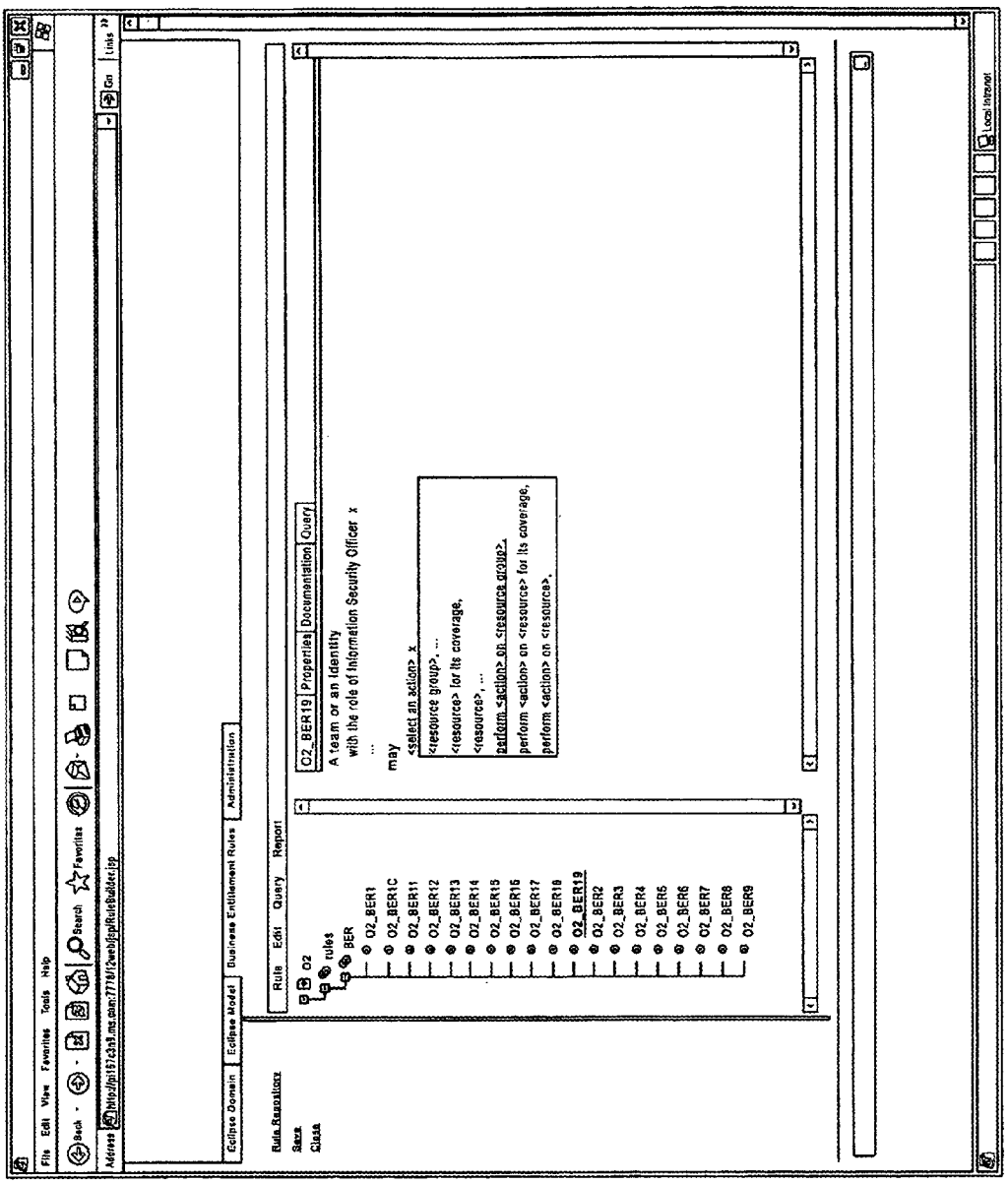
Figure 30:
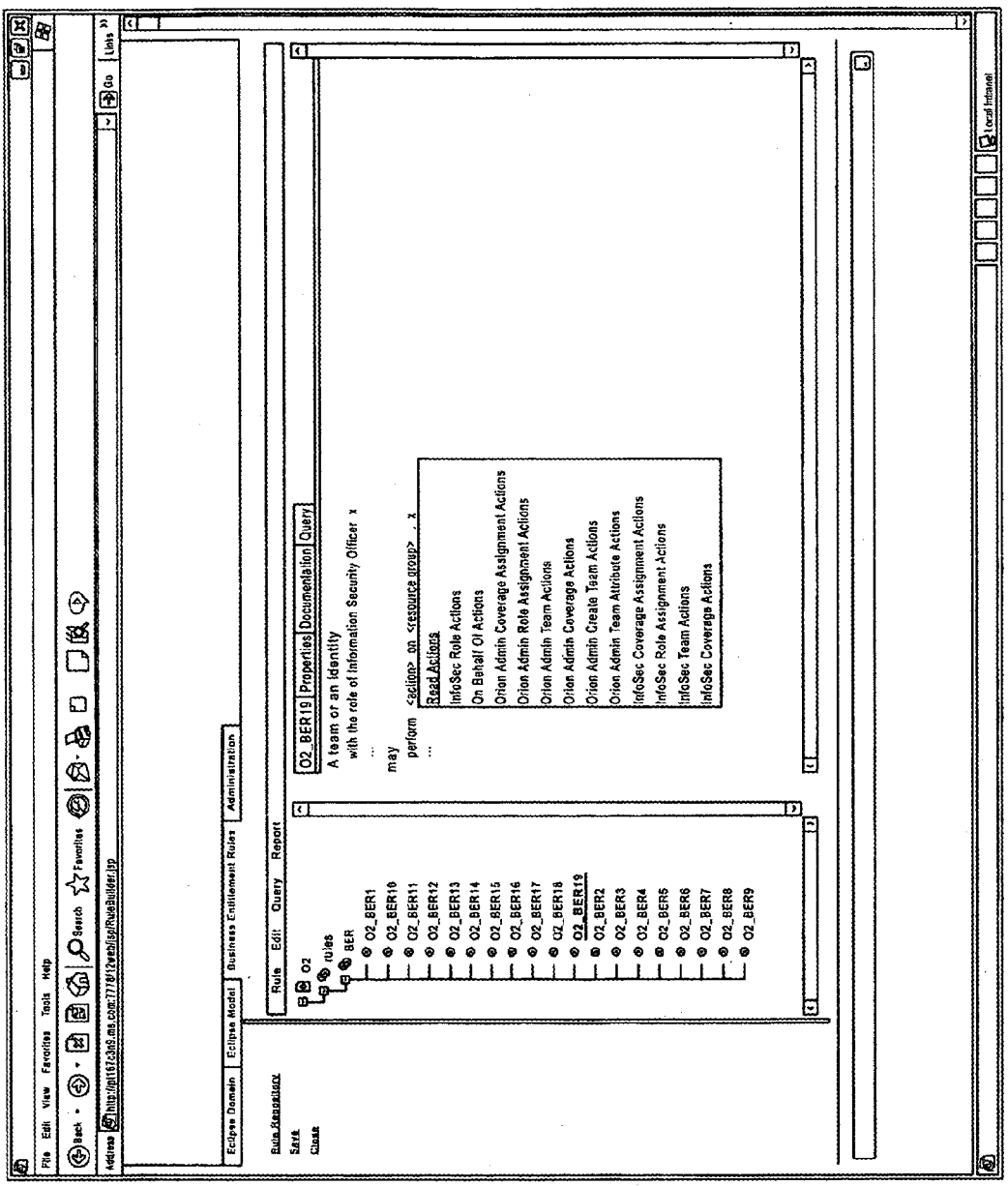
Figure 31:
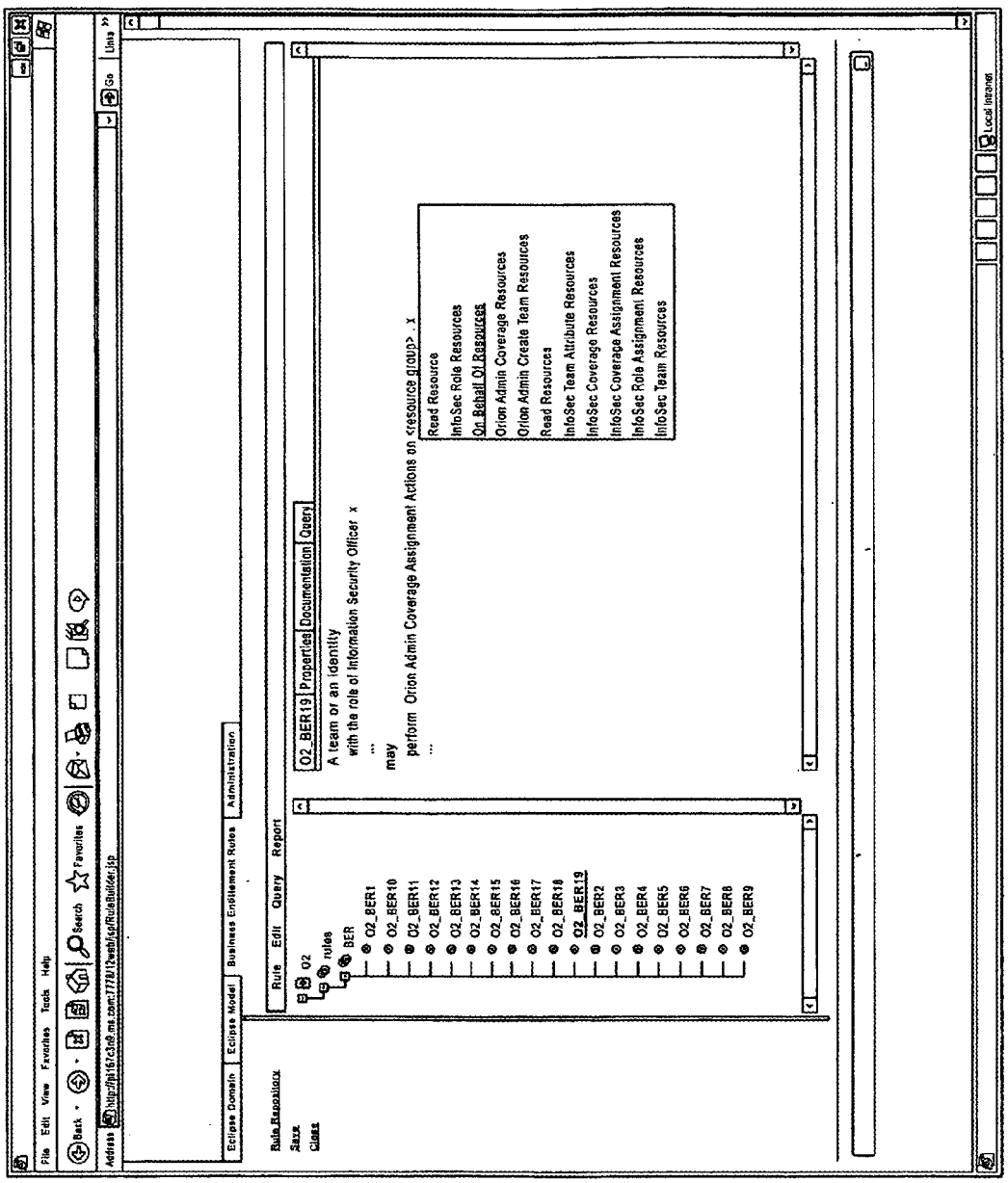
Figure 32:
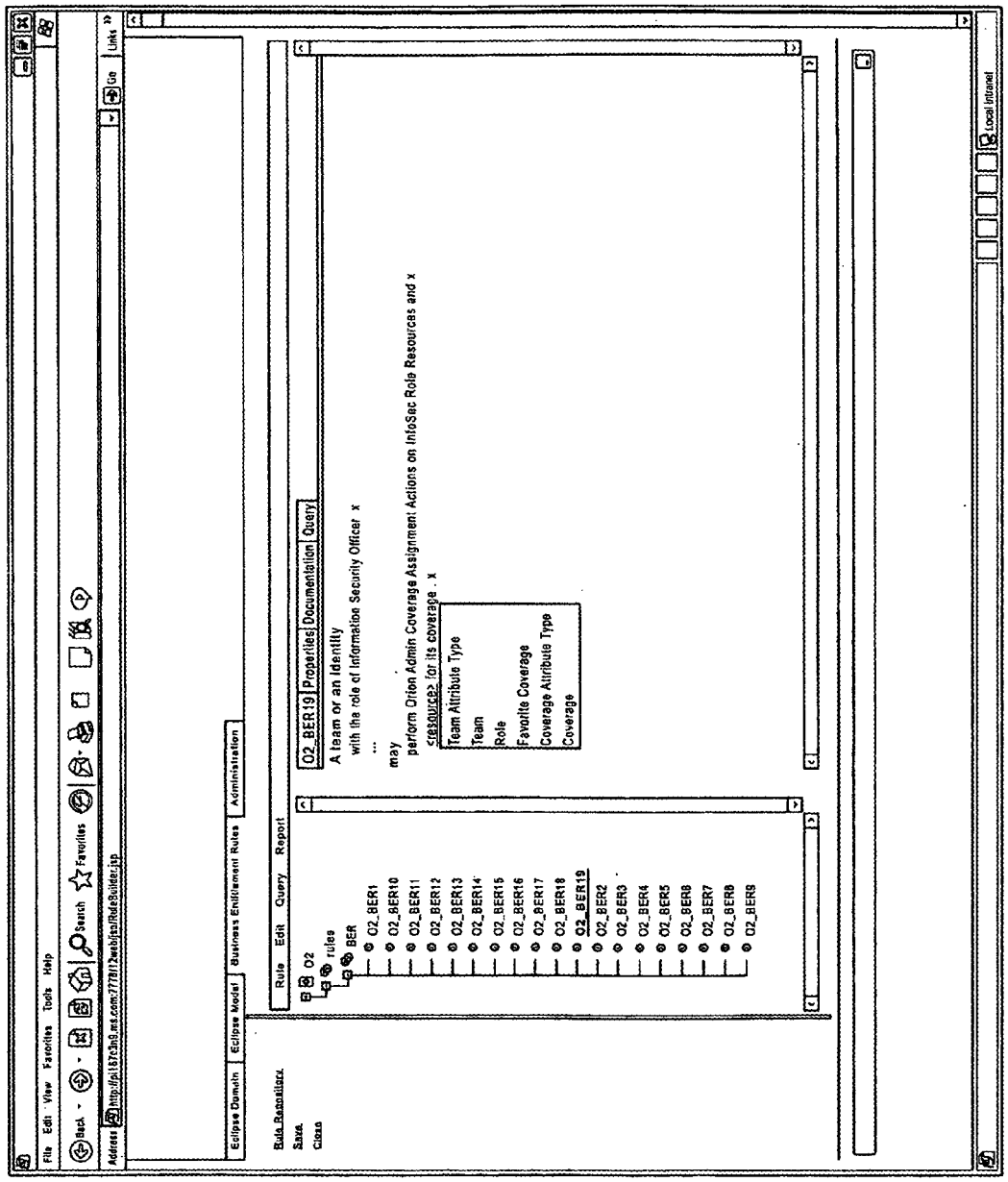
Figure 33:
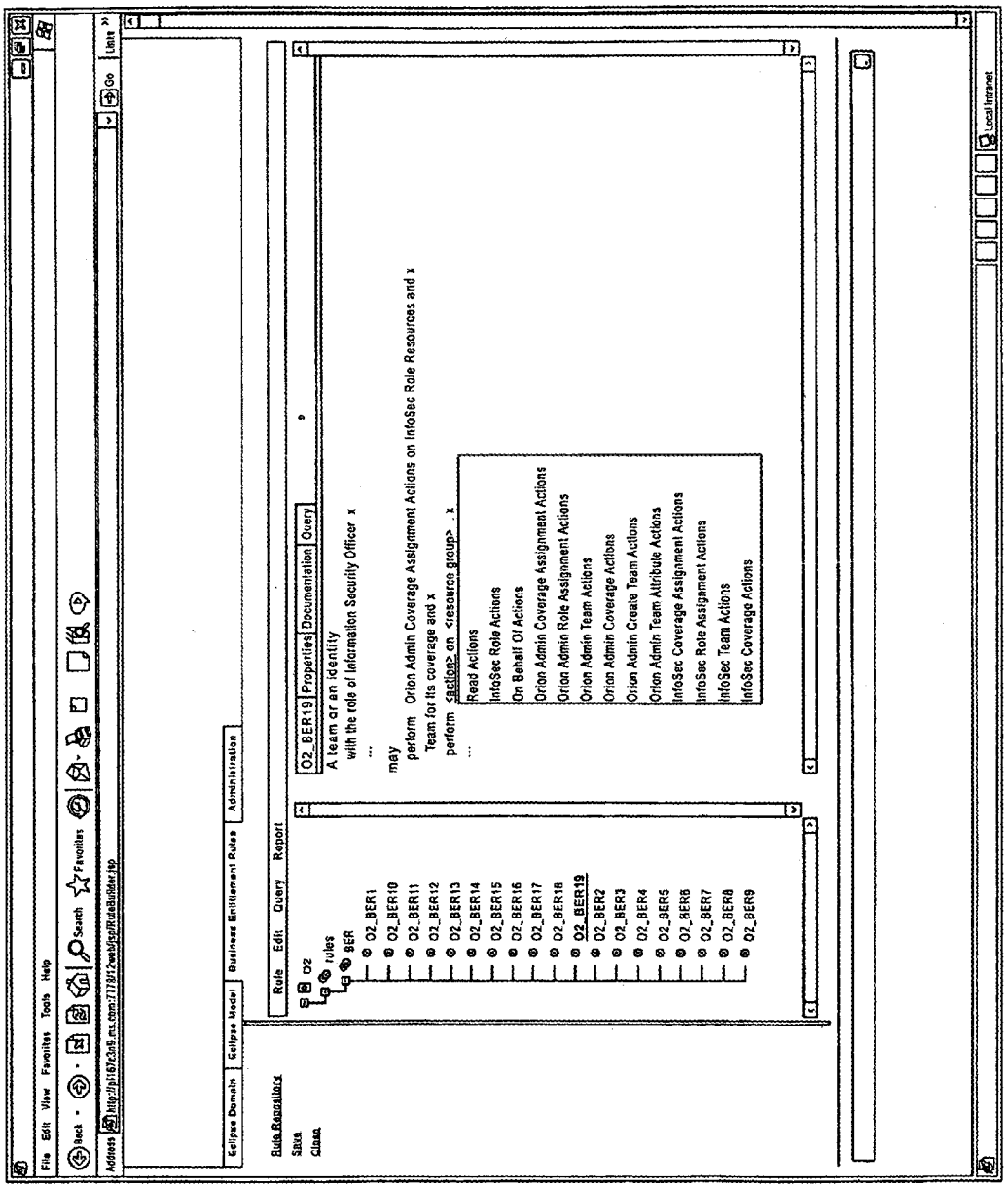

FIGS. 27 through 33 illustrate example screen printouts of an implementation of the system 2301 of FIG. 23 according to various embodiments of the present invention. The figures generally depict the process of defining entitlement rules using the system 2301. In the figures, various embodiments allow for predetermined values to be presented to users in the process of defining rules. In FIG. 27, a user may select a role or coverage construct of a desired team or identity. In FIG. 28, the user may fill in the role variable in the selected construct of FIG. 27. In FIG. 29, the user may select an action construct for the team or identity. In FIG. 30, the user may fill in the action variable in the selected construct of FIG. 29. In FIG. 31, the user may fill in the resource group variable in the selected construct of FIG. 29. In FIGS. 32 and 33, the user may select further resources and actions to complete the definition of the entitlement rule.

The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

The various portions and components of various embodiments of the present invention can be implemented in computer software code using, for example, Visual Basic, C, or C++ computer languages using, for example, object-oriented techniques.

While several embodiments of the invention have been described, it should be apparent, however, that various modifications, alterations and adaptations to those embodiments may occur to individuals skilled in the art with the attainment of some or all of the advantages of the present invention. It is therefore intended to cover all such modifications, alterations and adaptations without departing from the scope and spirit of the present invention as defined by the appended claims.

What is claimed is:

1. A system, comprising at least one processor and operatively associated data storage, the data storage comprising instructions that, when executed by the at least one processor, causes the at least one processor to implement:

a centralized organizational information system that manages and stores organizational data at a centralized organizational information database, wherein the organizational data comprises:

user identity data describing a plurality of user identities;

relationship data describing a plurality of relationships, wherein each relationship defines a relationship between at least one user identity selected from the plurality of user identities and a group of user identities selected from the plurality of user identities;

role data describing a plurality of roles, wherein each role defines a job function assigned to at least one user identity selected from the plurality of user identities; and coverage data describing a plurality of coverages, wherein each coverage defines a scope of responsibility of at least one user identity selected from the plurality of user identities, with respect to an associated role, and wherein the coverages comprise one or more coverage attributes selected from data describing at least one of a line of business, a product, a client and a data management system;

a plurality of entitlements engines in communication with the organizational information system, and with applications that use secured resources, wherein each of the entitlements engines is configured to service at least one of the applications, wherein each of the entitlements engines is in communication with an entitlement database associated with the entitlements engine and, wherein each of the plurality of entitlements engines is configured to:

read data from the organizational information system, wherein the read data comprises role data indicative of an assigned job function and coverage data indicative of an assigned scope of responsibility;

receive at least one executable entitlement rule;

apply the at least one entitlement rule to the read data to create entitlement data, wherein the at least one entitlement rule specifies access policies that define, for at least one of the secured resources, an access policy based on a role selected from the plurality of roles and a coverage selected from the plurality of coverages;

store the entitlement data in the entitlements database associated with the entitlements engine, wherein the entitlement data is indicative of the user, the at least one of the secured resources and an action upon the at least one of the secured resources;

receive a query from one of the applications requesting an indication of whether the user of the application is authorized to access the at least one of the secured resources that is used by the application;

generate a response to the query considering the entitlement data.

2. The system of claim 1, wherein the entitlement generator is configured to communicate with at least one data source other than the one of the entitlement databases and the centralized organizational information system.

3. The system of claim 1, wherein the entitlement generator is configured to automatically generate the at least one executable entitlement rule based on a human readable input rule.

4. The system of claim 1, further comprising a reporting application in communication with the organizational information system.

5. The system of claim 1, wherein each of the entitlement databases includes data used to define the executable rule.

6. The system of claim 1, further comprising an account reference data database in communication with the organizational information system.

7. The system of claim 1, wherein at least one of the entitlements engines determines whether an entitlements administrator is entitled to administer secured resources by making a request of itself.

8. The system of claim 1, wherein the at least one of the entitlements engines determines whether the organizational information system is itself entitled to access organizational data.

9. A computer-implemented method, comprising:
  storing, in a centralized database, organizational data relating to an organization, wherein the storing is performed by a computer system comprising at least one processor and operatively associated data storage and wherein the organizational data comprises:
  user identity data describing a plurality of user identities;
  relationship data describing a plurality of relationships, wherein each relationship defines a relationship between at least one user identity selected from the plurality of user identities and a group of user identities selected from the plurality of user identities;
  role data describing a plurality of roles, wherein each role defines a job function assigned to at least one user identity selected from the plurality of user identities; and
  coverage data describing a plurality of coverages, wherein each coverage defines a scope of responsibility of at least one user identity selected from the plurality of user identities, with respect to an associated role, and wherein the coverages comprise one or more coverage attributes selected from data describing at least one of a line of business, a product, a client and a data management system;
  reading, by the computer system, organizational data from the centralized database, wherein the read data comprises role data indicative of an assigned job function and coverage data indicative of an assigned scope of responsibility;
  receiving by the computer system at least one executable entitlement rule;
  applying, by the computer system, the at least one entitlement rule to the read data to create entitlement data, wherein the at least one entitlement rule specifies access policies that define, for at least one secured resource, an access policy based on a role selected from the plurality of roles and a coverage selected from the plurality of coverages;
  storing, by the computer system, the entitlement data in an entitlements database, wherein the entitlement data is indicative of the user, the at least one of the secured resources and an action upon the at least one of the secured resources;
  receiving, by the computer system, a query from an application requesting an indication of whether the user of the application is authorized to access the at least one of the secured resources; and
  generating, by the computer system, a response to the query considering the entitlement data.

10. The method of claim 9, wherein determining, based on the executable entitlement rule whether a user is entitled to access secured resources comprises determining whether an entitlements administrator is entitled to administer secured resources.

11. The method of claim 9, wherein determining, based on the executable entitlement rule, whether a user is entitled to access secured resources comprises determining whether a user of an organizational information system is entitled to access organizational information.

12. The method of claim 9, further comprising applying the executable entitlement rule to the organizational data to derive data that is stored in the entitlements database.

13. A computer-readable medium having stored thereon instructions which, when executed by a processor, cause the processor to:
  store, in a centralized database, organizational data relating to an organization, wherein the organizational data comprises:
  user identity data describing a plurality of user identities;
  relationship data describing a plurality of relationships, wherein each relationship defines a relationship between at least one user identity selected from the plurality of user identities and a group of user identities selected from the plurality of user identities;
  role data describing a plurality of roles, wherein each role defines a job function assigned to at least one user identity selected from the plurality of user identities; and
  coverage data describing a plurality of coverages, wherein each coverage defines a scope of responsibility of at least one user identity selected from the plurality of user identities, with respect to an associated role, and wherein the coverages comprise one or more coverage attributes selected from data describing at least one of a line of business, a product, a client and a data management system;
  reading organizational data from the centralized database, wherein the read data comprises role data indicative of an assigned job function and coverage data indicative of an assigned scope of responsibility;
  receive at least one executable entitlement rule;
  apply the at least one entitlement rule to the read data to create entitlement data, wherein the at least one entitlement rule specifies access policies that define, for at least one secured resource, an access policy based on a role selected from the plurality of roles and a coverage selected from the plurality of coverages;
  store the entitlement data in an entitlements database, wherein the entitlement data is indicative of the user, the at least one of the secured resources and an action upon the at least one of the secured resources;
  receive a query from an application requesting an indication of whether the user of the application is authorized to access the at least one of the secured resources; and
  generate a response to the query considering the entitlement data, wherein the computer readable medium is a non-transitory computer readable medium.

14. An apparatus, comprising:
  means for storing, in a centralized database, organizational data relating to an organization, wherein the organizational data comprises:
  user identity data describing a plurality of user identities;
  relationship data describing a plurality of relationships, wherein each relationship defines a relationship between at least one user identity selected from the plurality of user identities and a group of user identities selected from the plurality of user identities;

role data describing a plurality of roles, wherein each role defines a job function assigned to at least one user identity selected from the plurality of user identities; and coverage data describing a plurality of coverages, wherein each coverage defines a scope of responsibility of at least one user identity selected from the plurality of user identities, with respect to an associated role, and wherein the coverages comprise one or more coverage attributes selected from data describing at least one of a line of business, a product, a client and a data management system;

means for reading organizational data from the centralized database, wherein the read data comprises role data indicative of an assigned job function and coverage data indicative of an assigned scope of responsibility;

means for receiving at least one executable entitlement rule;

means for applying the at least one entitlement rule to the read data to create entitlement data, wherein the at least one entitlement rule specifies access policies that define, for at least one secured resource, an access policy based on a role selected from the plurality of roles and a coverage selected from the plurality of coverages;

means for storing the entitlement data in an entitlements database, wherein the entitlement data is indicative of the user, the at least one of the secured resources and an action upon the at least one of the secured resources;

means for receiving a query from an application requesting an indication of whether the user of the application is authorized to access the at least one of the secured resources; and means for generating a response to the query considering the entitlement data.

* * * * *